United States Patent [19]
Chen et al.

[11] Patent Number: 5,588,098
[45] Date of Patent: Dec. 24, 1996

[54] METHOD AND APPARATUS FOR DIRECT MANIPULATION OF 3-D OBJECTS ON COMPUTER DISPLAYS

[75] Inventors: Michael Chen, Mountain View, Calif.; Stephanie L. Houde, Cambridge, Mass.; Robert H. Seidl, Palo Alto, Calif.

[73] Assignee: Apple Computer, Inc., Cupertino, Calif.

[21] Appl. No.: 475,405

[22] Filed: Jun. 7, 1995

Related U.S. Application Data

[63] Continuation of Ser. No. 329,695, Oct. 26, 1994, abandoned, which is a continuation of Ser. No. 769,198, Nov. 22, 1991, abandoned.

[51] Int. Cl.⁶ ..................................................... G06T 17/40
[52] U.S. Cl. ........................... 395/137; 395/138; 395/139
[58] Field of Search ..................................... 395/133, 136, 395/137, 138, 139

[56] References Cited

U.S. PATENT DOCUMENTS 5,428,721  6/1995  Sato et al. ............................... 395/133

*Primary Examiner*—Mark K. Zimmerman
*Attorney, Agent, or Firm*—V. Randall Gard; John S. Ferrell; J. Eppa Hite

[57] ABSTRACT

A method and apparatus for direct manipulation of 3-D objects on computer display. This method and apparatus provides for a 3-D bounding region wherein the 3-D bounding region has sensitive areas which the user can select with a reference pointer such that when the user manipulates the reference pointer after selecting a sensitive area the 3-D bounding region and the object within it are manipulated with direct kinesthetic correspondence between the user's manipulation of the reference pointer and the bounding region and object manipulation.

94 Claims, 17 Drawing Sheets

[INSET$_X$ = ($X_{max}$ - $X_{min}$) * FACELINE PERCENTAGE]

[INSET$_Y$ = ($Y_{max}$ - $Y_{min}$) * FACELINE PERCENTAGE]

METHOD AND APPARATUS FOR DIRECT MANIPULATION OF 3-D OBJECTS ON COMPUTER DISPLAYS

This is a continuation of application Ser. No. 08/329,695, filed on Oct. 26, 1994, and now abandoned, which is a continuation of the prior application Ser. No. 07/796,198, filed on Nov. 22, 1991, and now abandoned.

FIELD OF THE INVENTION

The present invention relates to the field of manipulation of 3-D objects on computer displays. More specifically, the present invention relates to the field of manipulation of a 3-D object displayed on a computer display with kinesthetic feedback to the user directing the manipulation.

BACKGROUND OF THE INVENTION

Many prior art computer systems include computer controlled display systems which utilize bit-mapped displays which typically present a graphic image to the user of the computer system. In these computer controlled display systems, a bit-mapped image appears on a display means, such as a cathode ray tube (CRT) or liquid crystal display (LCD); the bit-mapped image is typically generated and stored in a frame buffer which acts as a memory for the display system. In these display systems, the user typically interacts with the computer system by manipulating a cursor control means, such as a mouse. The user uses the mouse to position a cursor on the bit-mapped image to select options which are displayed under the control of the computer system on the display means.

Advances in computer graphics have extended the range of capabilities for the user. Objects can now be displayed in three-dimensional (3-D) representation, for example in wireframe, solid and/or shaded forms.

While 3-D trackball input controller devices (or other 3+ dimensional input controller devices) have been utilized for manipulating objects displayed in 3-D representation, they are generally complex and expensive.

Various techniques utilizing two-dimensional (2-D) input controllers such as a mouse have been developed for manipulating objects displayed in 3-D representation.

A known technique utilizes graphically displayed X, Y, and Z sliders which are adjusted by the user (for example, with an input controller such as a mouse) to indicate the amount of rotation about each axis independently. Typically, only one slider is adjusted at any given time.

Another known technique involves the menu selection of the axis about which rotation is desired. An input controller such as a mouse is then moved in one dimension to indicate the amount of rotation.

Still another technique involves holding down one of three buttons on a mouse or a keyboard to select the axis of rotation, and then moving a mouse in one dimension to indicate the amount of rotation.

A still further technique involves selecting the object by clicking on it with the mouse pointer and again using the mouse pointer to drag a handle on the selected object in order to move, re-shape, re-size, or rotate the object. Oftentimes, with 3-D objects, only one or two dimensions can be altered with any given handle and rotation only occurs around a central point in a world 3-D space as opposed to rotation around the centerpoint (or other axis) of the 3-D object itself (sometimes referred to as model space).

An even further technique involves selecting a 3-D object by clicking on it with the mouse pointer, using the mouse pointer to make a menu selection as to a predefined type of movement option desired and again using the mouse pointer to drag a handle on the selected object in order to define a movement of the selected predefined type of movement. Typically, with 3-D objects, only one predefined type of movement is available at a time in what is commonly known as a modal form of operation.

An important consideration with known techniques for manipulating displayed objects represented in 3-D form is the lack of kinesthetic correspondence (or stimulus-response compatibility) between the movement of the input controller device and the object movement or direction of object rotation. That is, the required movement of the input controller device does not provide the sense of directly manipulating the displayed object. Stated differently, known techniques for manipulating displayed objects represented in 3-D form typically lack direct manipulation kinesthetic correspondence whereby the 3-D displayed object being manipulated continuously moves (is continuously re-displayed) with the mouse controlled pointer directing the manipulation so that the pointer may remain on the same location of the displayed 3-D object throughout the manipulation.

A still further consideration is the inherent limitation of the modal form of 3-D object manipulation which further separates the user's expectations regarding moving a real world 3-D object from the experience of moving an image of the 3-D object on a computer display due to having to either select between alternative manipulation modes and/or operate in different windows each containing different views of the object to be manipulated.

SUMMARY AND OBJECTS OF THE INVENTION

An objective of the present invention is to provide an improved technique for manipulating objects displayed in 3-D representation with 2-D input controller devices which provides for kinesthetic correspondence between input controller motion and displayed object movement.

Another objective of the present invention is to provide an improved technique for intuitively manipulating displayed 3-D objects such that the displayed 3-D object manipulation emulates physical 3-D object manipulation.

A still further objective of the present invention is to provide an improved technique for manipulation of displayed 3-D objects which provides for de-coupled object rotation, both homogenous and non-homogenous object scaling and object translation on a plane of the 3-D space.

An even further objective of the present invention is to provide an improved technique for manipulation of displayed 3-D objects which provides for seamless transition from one type of object manipulation to another type of object manipulation whereby explicit manipulation tools need not be selected between the object manipulations.

Another objective of the present invention is to provide an improved technique for manipulation of displayed 3-D objects which provides the user with visual clues as to the manipulations available and to the means to facilitate such manipulations.

The foregoing and other advantages are provided by a method for manipulating an object displayed in three-dimensional representation on a computer controlled display system having a computer and a display coupled to the computer, the method comprising the steps of providing a user actuated input controller for selectively positioning a reference indicator on the display, positioning the reference indicator over the displayed object and signaling the computer to activate a control movement mode, providing a three-dimensional representation of a bounding region, positioning the reference indicator over a portion of the bounding region sensitive to the presence of the reference indicator, signaling the computer to activate a predefined control movement type specified by the sensitive portion of the bounding region under the reference indicator and repositioning the reference indicator to define a movement of the predefined control movement type, and re-displaying the displayed object in accordance with the defined movement of the predefined control movement type.

The foregoing and other advantages are provided by an apparatus for manipulating an object displayed in three-dimensional representation on a computer controlled display system having a computer and a display coupled to the computer, the apparatus comprising means for positioning a reference indicator over the displayed object and signaling the computer to activate a control movement mode, means for generating a three-dimensional representation of a bounding region, means for signaling the computer to activate a predefined control movement type specified by the sensitive portion of the bounding region under the reference indicator and repositioning the reference indicator to define a movement of the predefined control movement type, and means for re-displaying the displayed object in accordance with the defined movement of the predefined control movement type.

Other objects, features, and advantages of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Figure 1:
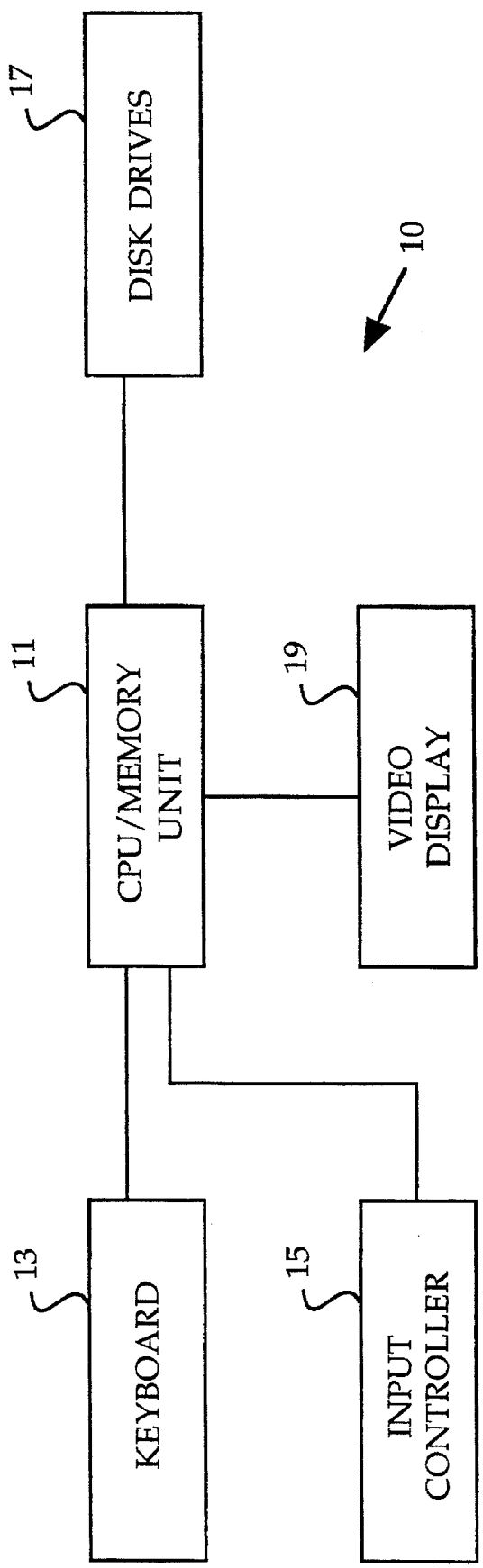
FIG. 1 depicts a generalized block diagram of a computer system as might be used by the present invention.

The present invention generally involves the manipulation of a computer displayed object represented in three-dimensional form, and it would be helpful to provide a brief discussion of the pertinent computer environment. FIG. 1 is a generalized block diagram of an appropriate computer system 10 which includes a CPU/memory unit 11 that generally comprises a microprocessor, related logic circuitry, and memory circuits. A keyboard 13 provides inputs to the CPU/memory unit 11, as does two-dimensional input controller 15 which by way of example can be a mouse, a 2-D trackball, a joystick, a stylus, a touch screen, a touch tablet, etc. Disk drives 17, which can include fixed disk drives, are used for mass storage of programs and data. Display output is provided by a video display 19.

Figure 2:
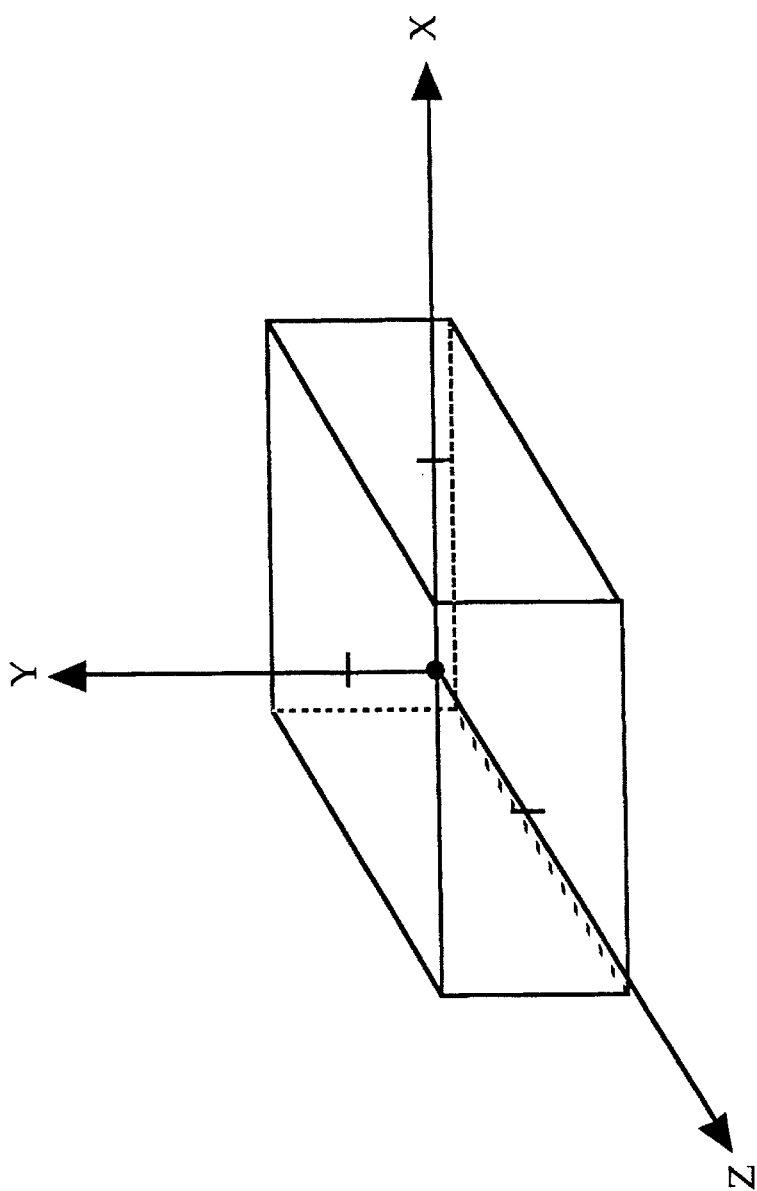
FIG. 2 depicts the object model coordinate system as used by the present invention.

Referring now to FIG. 2, the object viewed on the video display 19 can be referenced for convenience relative to an orthogonal coordinate system (having X, Y and Z axes) called the model coordinate system (or model space) that has its origin at the center of rotation of the object.

For ease of understanding, the following discussion will be in the context of using a two-dimensional input controller 15 that is a mouse (used in the preferred embodiment of the present invention), but it should be readily appreciated by those skilled in the art that the disclosed techniques can be implemented with other 2-D or 3-D (or even greater numbers of dimensions) input controller devices.

A mouse controls the position of a mouse pointer (e.g., a reference indicator such as a cursor) that is displayed on the video display. The pointer is moved by moving the mouse over a flat surface, such as the top of a desk, in the desired direction of movement of the pointer. Thus, the two-dimensional movement of the mouse on the flat surface translates into a corresponding two-dimensional movement of the mouse pointer on the video display.

A mouse typically has one or more finger actuated control buttons. While the control buttons can be utilized for different functions such as selecting a menu option pointed to by the pointer, the disclosed invention advantageously utilizes a single mouse button to select a 3-D object and to trace the movement of the pointer along a desired path. Specifically, the pointer is located at the desired starting location, the mouse button is depressed to signal the computer to activate a control movement mode, and the mouse is moved while maintaining the button depressed. After the desired path has been traced, the mouse button is released. This procedure is sometimes referred to as dragging the mouse pointer. It should be appreciated that a predetermined key on a keyboard could also be utilized to activate dragging the mouse pointer.

In the present invention, when a 3-D object displayed on a visual display of a computer system is selected by the user, a 3-D "virtual box" or "bounding box" appears on the visual display such that the bounding box completely surrounds the 3-D object. One might view the bounding box as a glass box enclosing the selected object. The bounding box thus signals the user that the 3-D object has been selected. Further, the bounding box allows for direct manipulation of the enclosed 3-D object as will be explained below. Note that it is well within the scope of the present invention to provide a bounding region having a shape other than a generally rectangular or box shape. Such a bounding region could be of any of a great number of shapes including oblong, oval, ovoid, conical, cubic, cylindrical, polyhedral, spherical, etc.

Direct manipulation of the 3-D object, which manipulation generally comprises moving, scaling, or rotating the object, can be accomplished in different ways depending upon which embodiment of the present invention the user has chosen and which implementation is supported by a given computer system.

Figure 3:
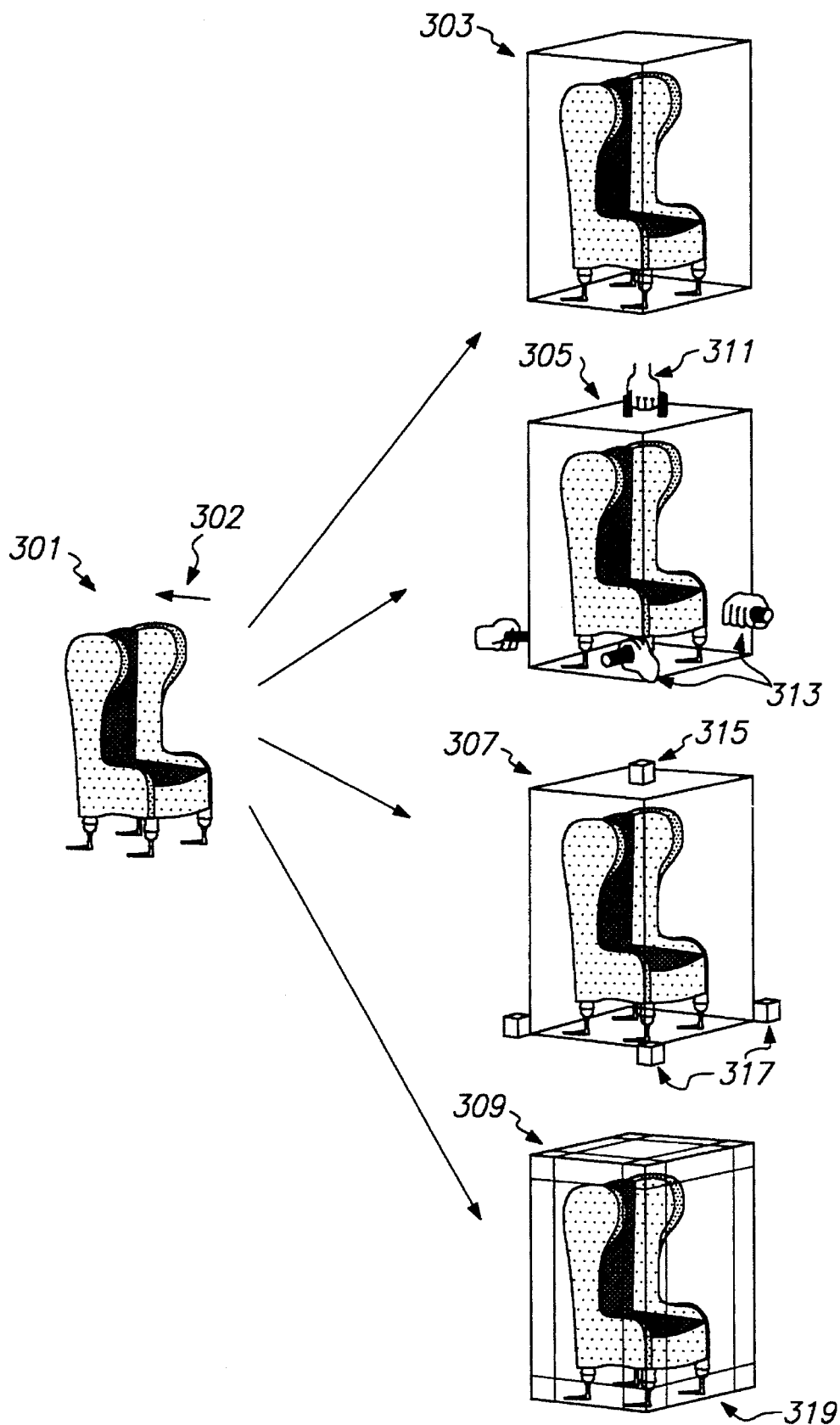
FIG. 3 depicts a 3-D representation of an object and some alternative embodiments of an object surrounded by a bounding box.

Referring now to FIG. 3, a 3-D representation of an object 301, in this case a wing back chair, is shown as displayed on the visual display of a computer system. When the user selects chair 301, by moving the mouse until the pointer 302 is on the chair and clicking on the chair by pressing the mouse button (or using a keyboard equivalent), the chair is surrounded by a bounding box 303. Alternative embodiments include a bounding box 305 with hands, a bounding box 307 with handles, and a bounding box 309 with active zones (or hot zones), as is explained more fully below.

In the preferred embodiment of the present invention, the bounding box 303, which appears as a result of the user selecting the 3-D object 301 and as was stated above, is a 3-D transparent box which completely surrounds the selected 3-D object 301. The bounding box 303 is thus, at a minimum, a visual clue to the user that the 3-D object has been selected.

With the bounding box 305 with hands embodiment, the user is given further clues as to what manipulations are possible with the selected object. Not only is the user informed that the 3-D object 301 has been selected, but the user is also given indications as to what manipulation operations might be possible with the selected object. The top hand 311 of the bounding box 305 appears to be pulling the bounding box up (or pushing down or both) and thus indicates to the user that the 3-D object can be lifted. The hands 313 around the base of the bounding box 305 appear to be pushing or pulling the bounding box around in a circle and thus indicate to the user that this 3-D object can be spun around if so desired.

A similar situation exists with the bounding box 307 with handles. Again, the user is given clues as to what manipulation operations might be possible with the selected object. The top handle 315 of the bounding box 307 appears to be available for grabbing and pulling the bounding box up (and/or pushing the bounding box down) and thus tells the user that the 3-D object can be lifted up or down. The handles 317 around the base of the bounding box 307 appear to be available for pushing or pulling the bounding box around in a circle and thus tell the user that this 3-D object can be spun around if so desired.

With the bounding box 309 with active zones, the user is given different clues (and, as will be explained below, some of these clues are user selectable to thus lessen any visual clutter which may exist with the visible active zones). Again, the bounding box tells the user that the 3-D object has been selected. Further, additional lines on the bounding box tell the user that there are different active, or hot, zones available to be used.

Placement of manipulation controls directly on the bounding box in positions which mirror those places one would touch a similarly shaped object in the real, physical world makes interaction with the displayed 3-D object more intuitive. In the preferred embodiment of the present invention, the location of the rotation controls along the edges of the bounding box (where two faces meet) provides users with particularly intuitive rotation control based on the user's real world experiences. It is common to turn real world objects by grabbing onto a good "hand-hold" such as an exposed corner and pushing or pulling the objects around in a desired direction. The edges of a real box shaped object thus function as hand holds for rotation. Similarly, the edges of the bounding box function as intuitive "cursor holds" for rotation. Users intuitively "push" or "pull" on the edges of the displayed bounding box with the reference pointer to achieve object rotation.

Figure 11:
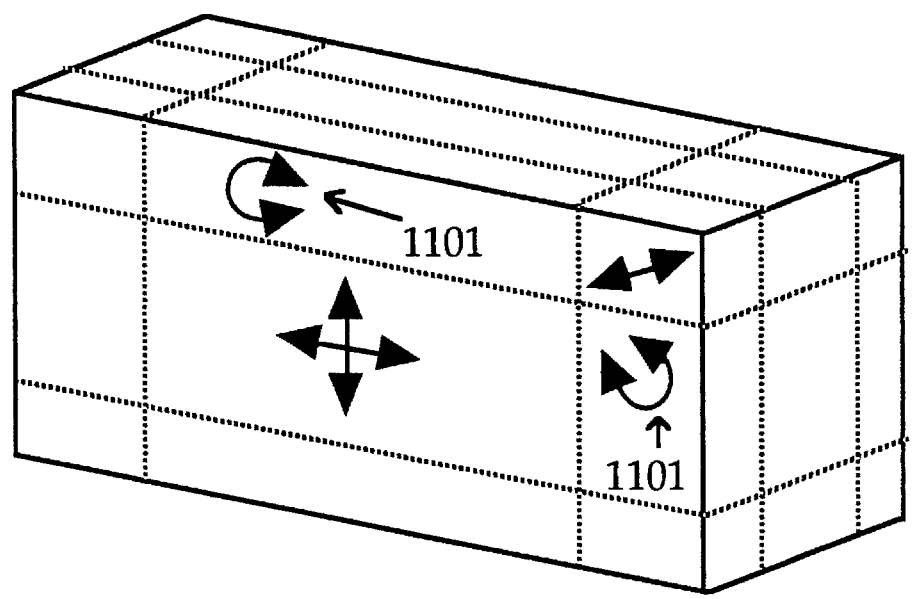
FIG. 11 depicts the further visual cues of a changing pointer as provided by alternative embodiments of the present invention.
Figure 12:
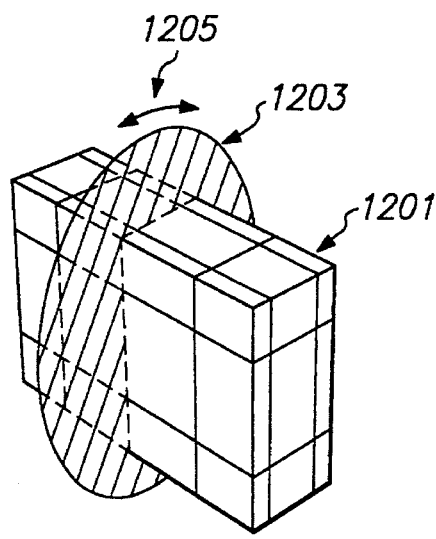
FIG. 12 depicts the further visual clues for a rotation manipulation as provided by alternative embodiments of the present invention.
Figure 13:
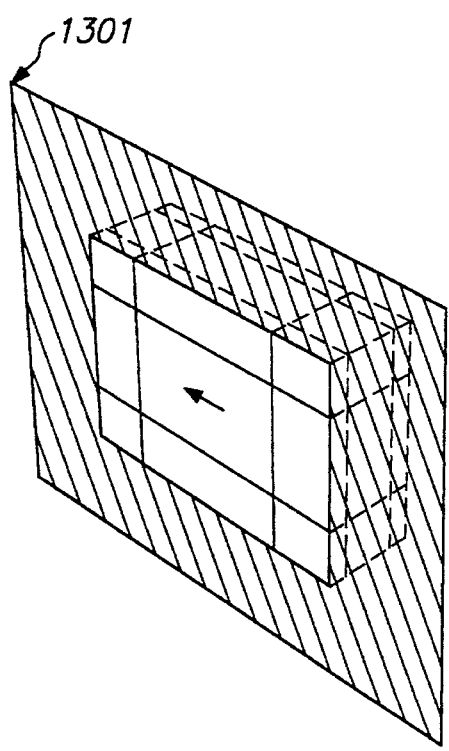
FIG. 13 depicts the further visual clues for a translation manipulation as provided by alternative embodiments of the present invention.

Still further embodiments of the present invention would further support spring-loaded object manipulations (as is explained below) by providing additional manipulation clues to the user. FIG. 11 shows the pointer changing to a curved arrow indicating rotation manipulations in the case of a rotation active zone selection, to crossed arrows indicating the plane of movement in the case of a translation active zone selection and to an enlarging arrow indicating that dimensions are to be affected in the case of a scaling active zone selection. FIG. 12 shows a selected object's bounding box 1201 of an alternate embodiment of the present invention displaying a circle 1203 (or ellipse when the object and bounding box are in a perspective view) when a rotation active zone is selected to thus indicate the rotation possibilities with a given rotation active zone. The displayed circle 1203 could further display a curved arrow 1205 around a portion of the circumference of the displayed circle 1203 to thus signal the user as to the manipulations possible with the selected, rotation active zone. Similarly, with translation manipulations, FIG. 13 shows a translucent plane 1301 which would be displayed to thus indicate the plane of translation available with a given selected translation active zone. Again, with spring-loaded active zones (further explained below), whenever the user stops pressing the mouse button the manipulation icon or rotation circle would no longer be displayed and the original pointer would again be displayed.

Figure 4:
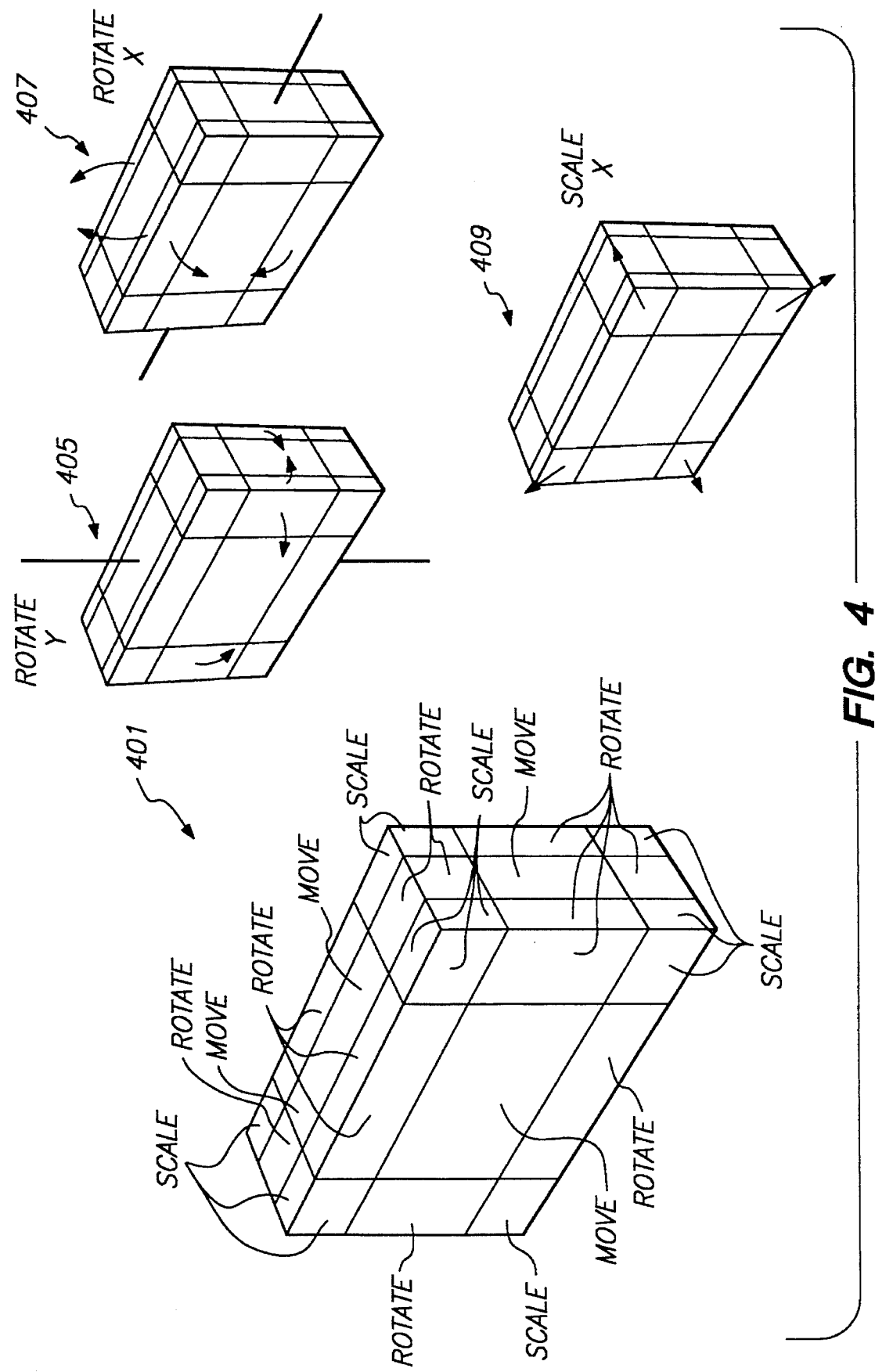
FIG. 4 depicts the active zone layout of the preferred embodiment of the present invention and some of the object and bounding box manipulations supported by the present invention.

Referring now to FIG. 4, a bounding box with active zones 401 is shown. It should be appreciated by one with ordinary skill in the art of the present invention that although the preferred embodiment of the present invention utilizes a bounding box represented as a wireframe with no back lines visible and with the object remaining visible within the bounding box (e.g., bounding box 309 in FIG. 3), the back lines of the bounding box could also be displayed or the bounding box could even be displayed as a solid (no back faces or lines visible) with the object inside either visible (a transparent solid bounding box), not visible (an opaque solid bounding box), visible yet faint or greyed out (a translucent solid bounding box), etc., all as alternative embodiments which could be user selectable. Note, however, that no object is shown within the bounding box in the figure so as to avoid any potential visual clutter (which option could be user selectable in a still further alternative embodiment of the present invention).

In the preferred embodiment of the present invention, each face of the bounding box with active zones 401 is divided into 9 active zones. Clicking the pointer in any one of these active zones and dragging will result in moving, rotating, or scaling the bounding box (along with the 3-D object within the bounding box) depending upon which active zone is selected.

The bounding box 401 with active zones allows various paradigms for 3-D object manipulation. To scale the 3-D object the user grabs a corner of the bounding box and pulls. To rotate the 3-D object the user grabs an edge of the bounding box and turns the bounding box. To move (translate) the 3-D object the user grabs a face of the bounding box and slides the bounding box.

And again, with a bounding box, the user need not worry about where within an active zone to grab a particular 3-D object (regardless of object shape) in order to perform any one of the desired manipulations because the bounding box provides a consistent user interface across all object shapes. For example, if the 3-D object is a floor lamp, the user need not worry about whether it is "proper" to pick up the lamp by the shade, the base, or the pole. This is because the bounding box consistently defines the available actions and means to perform those actions. In other words, when faced with individual objects of varying shapes and contours, each user has a different idea of how the object should be "touched" with the reference pointer in order to directly manipulate the object. By allowing the user to control any object by directly manipulating the object's 3-D bounding box upon selection, the user need only learn how to interact with that one simple box shape. This provides for a consistent approach and interface to controlling any object shape. Furthermore, the interface is reinforced by each object manipulation.

Still further, the use of a 3-D bounding box improves user perception of the virtual 3-D screen space in which objects are displayed. When viewing 3-D projections of objects on a flat 2-D screen space, it is oftentimes difficult for users to perceive the depth and volume of objects. The wire frame bounding box has a contour that is more easily understood as a 3-D object by the user than are other more complex or subtly shaped objects.

The bounding box with active zones 401, as shown in FIG. 4, shows the manipulations possible by clicking and dragging in the various active zones. The chosen operation (scale, rotate, or move) is determined by the active zone in which the user clicks. The axis or axes along which the bounding box is scaled, rotated, or translated is/are chosen according to the particular active zone and face which is clicked on.

Further, it is important to note that these manipulations are not limited to only one face of the 3-D object but rather are available for each visible face (which can range from one to three faces depending upon the current orientation of the 3-D object). It is also important to note that the particular manipulations for each active zone (as well as the number and type of active zones) could be user selectable such that the corner active zones, for example, perform rotation manipulations instead of scaling manipulations as is shown in the embodiment of FIG. 4. Furthermore, in the preferred embodiment of the present invention, the visible lines delineating the active zones on the bounding box are optionally drawn a user settable distance or percentage in from each face edge of the bounding box (the "inset" as is explained more fully below) thus providing users with an explicit view of the active zone layout as well as allowing users to alter the relative sizes of the active zones. It should be appreciated by one with ordinary skill in the art that alternative active zone layouts and locations as well as having greater or fewer active zones (or to not show the active zones on the bounding box) is well within the scope of the present invention.

Bounding box with active zones 403 shows some of the move or translate manipulations available by clicking and dragging on the move active zone of the left front face of bounding box 401. The move manipulation allows moving the bounding box along with the 3-D object inside across the plane of the chosen face of the bounding box. Note that the bounding box 403 with active zones can be moved anywhere within the chosen plane and is not limited to the direction of the arrows in the figure.

Note that in an alternative embodiment object translation would occur relative to the location of another 3-D object. In this way, manipulation of a 3-D object in a room model space would be performed relative to the object's "resting plane" which would be the floor of the room in the case of a chair object but would be a wall in the case of a hanging picture object. Furthermore, in this alternative embodiment, translations would be limited to sliding in two dimensions parallel to the resting plane and lifting would be limited to a path perpendicular to the floor.

Bounding boxes 405 and 407 with active zones show some of the rotate manipulations available by clicking and dragging on the rotate active zones of the front, top, or right side faces of the bounding box 401 with active zones. The rotate manipulation allows rotating the bounding box along with the 3-D object inside around one of the three axes of the bounding box and the object within it. Bounding box 405 depicts rotation around the object's Y axis using the left or right active zones. Bounding box 407 depicts rotation around the object's X axis using the top or bottom active zones. Note that the rotation active zones are arranged so that clicking on either side near an edge will result in rotations around the same axis which makes the selection less sensitive to minor locational inaccuracies by the user and also provides for greater user interface consistency.

The preferred embodiment of the present invention provides for decoupled rotations about the three (X, Y and Z) axes. De-coupled rotations require rotations to occur around a single axis at a time. In many 3-D object manipulation tasks (for example, arranging a scene containing a number of objects), rotating objects around a single axis at a time can be more intuitive than dealing with a coupled rotation around an arbitrary axis in 3-D space because rotating objects around a single axis at a time provides a more predictable object orientation manipulation.

Bounding box 409 with active zones shows some of the scaling manipulations available by clicking and dragging on the scaling active zones on the front face of bounding box 401. The scaling manipulation allows re-sizing the bounding box along with the 3-D object inside across one or two dimensions of the chosen face of the bounding box. Of course, re-sizing the bounding box along with the 3-D object it contains across one or two dimensions of the chosen face alters the relative dimensions of the bounding box and object and is thus a non-homogeneous scaling operation. An alternative embodiment of the present invention (user selectable by e.g., depressing a key on the keyboard, making a menu selection, setting a preference option, etc.) provides re-sizing (as opposed to re-shaping) the bounding box along with the object it contains across all three dimensions thus maintaining the relative dimensions of the bounding box and object and is thus a homogenous scaling operation. Please note that homogenous scaling operations would also tolerate greater user active zone selection inaccuracies because the same re-sizing operation would result from selecting any one of the up to three (depending upon bounding box orientation) displayed scaling active zones of a given bounding box corner.

In the preferred embodiment of the present invention, the bounding box with active zones thus provides what might be termed nine degrees of freedom: movement in three directions (up to two concurrently); rotation about any one of the three axes; and scaling along three directions.

Note that displaying the active zones of bounding box 401 (and bounding box 309 of FIG. 3) could be user selectable. Displaying the lines delineating the active zones could be used as a beginner mode which the user could turn off after becoming more experienced. In this way, when the user has become more proficient with 3-D object manipulation via bounding boxes with active zones, visually delineating the separate active zones could be turned off and the bounding box with active zones could be displayed as merely a bounding box as in 303 of FIG. 3. A more proficient user, who would likely be working with more complex 3-D objects, could thus choose simpler bounding boxes without delineated visible active zones.

An advantage of the bounding box with active zones (whether visible or not) is its lack of fixed modality. With the active zone bounding box implementation (and also with the alternative embodiments depicted in FIG. 3), it is not necessary to explicitly enter a "rotation mode," a "scaling mode," or a "move mode," via special commands, keystrokes, or palette selections. Instead, each transient "mode" is merely a temporary condition which is entered "on-the-fly" by clicking on one of the active zones (or handles in the alternative embodiments) and is exited by releasing the mouse button and might thus be termed "spring-loaded." Thus the particular manipulation "mode" chosen is only active while the mouse button remains pressed down.

This lack of fixed modality can speed up user interaction because a translation (move) can immediately follow a rotation, for example, without requiring extra user actions that might break the flow of interaction or the user's train of thought. Obviously, the less the user has to stop and think about how to do that which the user wishes to do, the more intuitive, seamless and simple it is for the user to complete the desired task. Furthermore, the preferred embodiment of the present invention allows these various sequential manipulations of the selected object to all be performed within a single window on the computer's display. In this way, the user need not worry about whether the current window is the right window for a particular manipulation type.

Still further, the bounding box provides direct manipulation capability which further increases its intuitiveness. Because the manipulation, be it moving, scaling, or rotating, is constrained to only one or two of the three possible axes of the 3-D object, every position on the box specifies exactly one particular movement, rotation, or scaling value. If the user keeps the pointer "pinned" to the spot on the bounding box originally clicked, the bounding box will appear to smoothly track the pointer movement. This thus further provides the desired kinesthetic feedback of direct locational coupling between the user motion and the 3-D object display motion which thus increases user intuitiveness.

Still further, it should be appreciated that the manipulations of the present invention are performed in an absolute sense rather than in a relative sense. An absolute manipulation bases the current object position on the difference between the current object position and the original object position. Stated differently, the transformation for an absolute manipulation is a gross determination of the current position versus the original position of all of the object movements made by the current manipulation. Conversely, relative manipulations determine the current object position as an incremental difference from the previous object position. Stated differently, the transformation for a relative manipulation is an incremental determination of the current position versus the last position, or each small incremental object movement made by the current manipulation. The importance of using absolute manipulation determinations is the improved user intuitiveness. The improved user intuitiveness is due to the result of absolute determinations wherein when a user returns the pointer to the original location in an object manipulation, the object is returned to its original orientation because the gross difference is zero. Conversely, if relative determinations were used, the user could return the pointer to the original location in an object manipulation yet the object might not return to its original orientation because the incremental differences might not be zero. The ability of the present invention to always return the object being manipulated to its original orientation if the user returns the pointer to the starting point of the manipulation thus provides greater user intuitiveness. Therefore, absolute manipulation determinations provide an "on the fly" undo capability because the user is able to undo an object manipulation by merely returning the pointer to its starting point.

Generally, in the art of the present invention, the object to be manipulated is either in world space coordinates or in model space coordinates which are passed through transforms in order to reach world space coordinates as is explained more fully below (and either way the object must also pass through a viewing transform as is well known in the art) in order to be displayed. In the preferred embodiment of the present invention, the object is stored in model space coordinates in order to facilitate more efficient manipulation calculations. Therefore, the object must first pass through a transformation, which translates the object to world space, before being displayed on the computer display.

In the preferred embodiment of the present invention, this transformation from model space to world space is represented as three separate transformations; one for scaling, at least one for rotation (alternative embodiments support multiple rotation transforms, as is explained more fully below), and one for translation. The concatenation (in this order, as will be explained below with reference to FIG. 10) of these three transforms forms the complete transformation from model space to world space.

The scale and translation transforms, in the preferred embodiment of the present invention, are separately stored as 3-D vectors and the rotation transform is stored as a 3×3 matrix. Storing the transforms separately allows changing any component of the three separate transforms without affecting the other transforms. The alternative (storing a single transformation matrix) is less efficient because it would require additional matrix computations.

Figure 5:
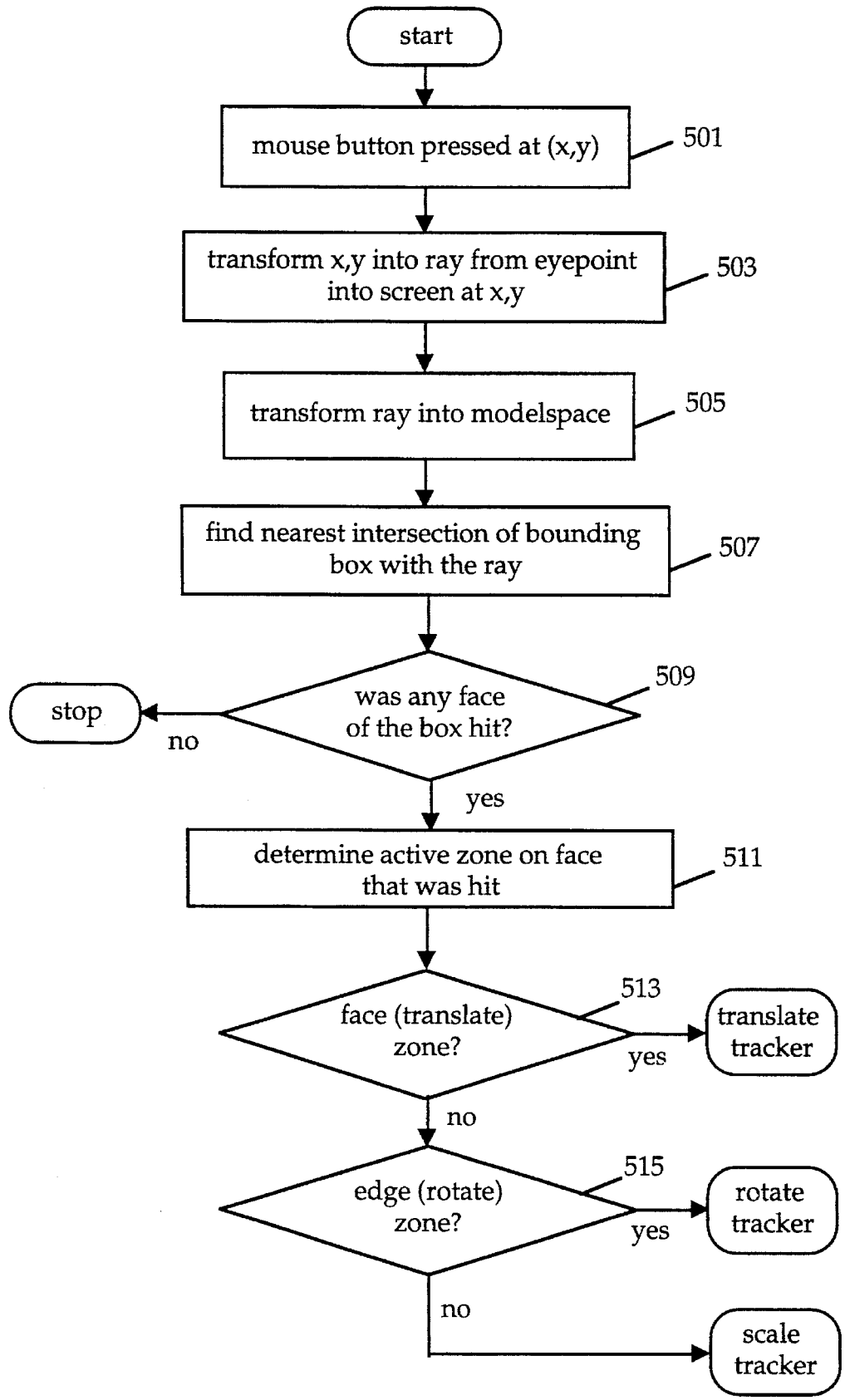
FIG. 5 is a flowchart depicting the sequence of steps preparing to handle a user manipulation.

As was explained above, in the preferred embodiment of the present invention, after an object has been selected and the bounding box is displayed the user can manipulate the bounding box and the object it contains by clicking on one of the spring-loaded active zones and dragging the bounding box in the desired direction of manipulation. Referring to FIG. 5, the user manipulation steps will now be described. After the object has been selected and the mouse button is again pressed 501, the next determination that needs to be made is whether the user is selecting an active zone in order to manipulate the bounding box and object or, alternatively, the user is deselecting the bounding box. The x and y coordinates of the pointer location when the user pressed the mouse button down are used to create a ray from the eyepoint into the screen at that x,y pointer location 503.

Please note that creation of such a ray is well known in the art and utilizes a basic formula that many ray tracing image generation schemes use. In those schemes, the screen plane is scanned and a viewing ray is created for each pixel of the image. In the preferred embodiment of the present invention, such a ray is created after each mouse button click when an object is selected.

Then, because the object is maintained in model space and the calculations in the preferred embodiment of the present invention are performed in model space (which is computationally more efficient), the ray is transformed into model space 505. The ray is defined by its origin, which is equal to the camera position or "eyepoint," and its direction. The direction vector of the ray is constructed by concatenating the vector (x,y,vd) with the 3×3 submatrix of M, where vd is the viewing distance (the distance from the projection plane to the eyepoint of the virtual camera) and M is the transpose of the 4×4 viewing matrix of the virtual camera. The ray is then transformed into the object's local coordinate system (model space) by multiplying both the ray's origin and direction with the inverse of the current transformation matrix (formed by concatenating the three transforms, one for each of scale, rotate and translate, as is explained more fully below).

Once the ray from the eyepoint into the screen at x,y is transformed into model space it can then be determined whether the user had the pointer placed over the bounding box when the mouse button was pressed (to thus perform a manipulation). This is accomplished by finding the nearest intersection of the bounding box with the ray 507. Given a viewing ray (origin and direction) in 3-D space, a 3-D axis-aligned bounding box (where the planes/faces of the bounding box are perpendicular to the coordinate axes; note that this is also known as "canonical") with extents given by boxMin and boxMax (the coordinate-wise numerical minima and maxima, respectively, of the bounding box), and a 4×4 modeling transformation on the bounding box (in the preferred embodiment of the present invention a concatenation of a scaling, a rotation and a translation transformation as was explained above and as will be further explained below), finding the intersection of the ray with the nearest face of the bounding box is a relatively simple matter which is well known in the art (see e.g., "Fast Ray-Box Intersection" by Andrew Woo, in *Graphics Gems*, Andrew Glassner, ed., Academic Press, 1990, or "Essential Ray-Tracing Algorithms" by Eric Haines, in *An Introduction to Ray Tracing*, Andrew Glassner, ed., Academic Press, 1989).

In the preferred embodiment of the present invention and as was explained above, instead of intersecting the original viewing ray with a plane of the transformed bounding box, the viewing ray is inverse-transformed into the model space of the axis-aligned bounding box. This causes intersections to then occur with axis-parallel planes which thus simplifies the calculations. In the preferred embodiment of the present invention, a 3-D version of the Woo algorithm described in *Graphics Gems* (citation above) is used. Furthermore, only those faces of the box visible to the virtual camera need to be tested for intersection. Thus, there is at most one intersection between the visible faces and the viewing ray. The position of this intersection point, as well as a number of other variables as discussed below with respect to particular manipulations, is then recorded. Please note that in an alternative embodiment the dimensions of the face planes are extended slightly outward when the intersection calculations are performed because some users might expect to hit a bounding box edge even when they hit close to the edge yet are still just outside the bounding box.

If no face of the bounding box is hit by the ray (no intersection is found between the viewing ray and any visible face of the bounding box), which merely means the user moved the pointer to another area of the screen before pressing the mouse button, then in the preferred embodiment of the present invention the object is de-selected and the bounding box would disappear ("stop" at step 509).

Conversely, if a face of the bounding box is hit by the ray (there is an intersection between the viewing ray and a visible face of the bounding box), then in the preferred embodiment of the present invention the intersection points in the 2-D coordinate space of the face that was hit are used to determine which and what type of active zone was hit.

Figure 14:
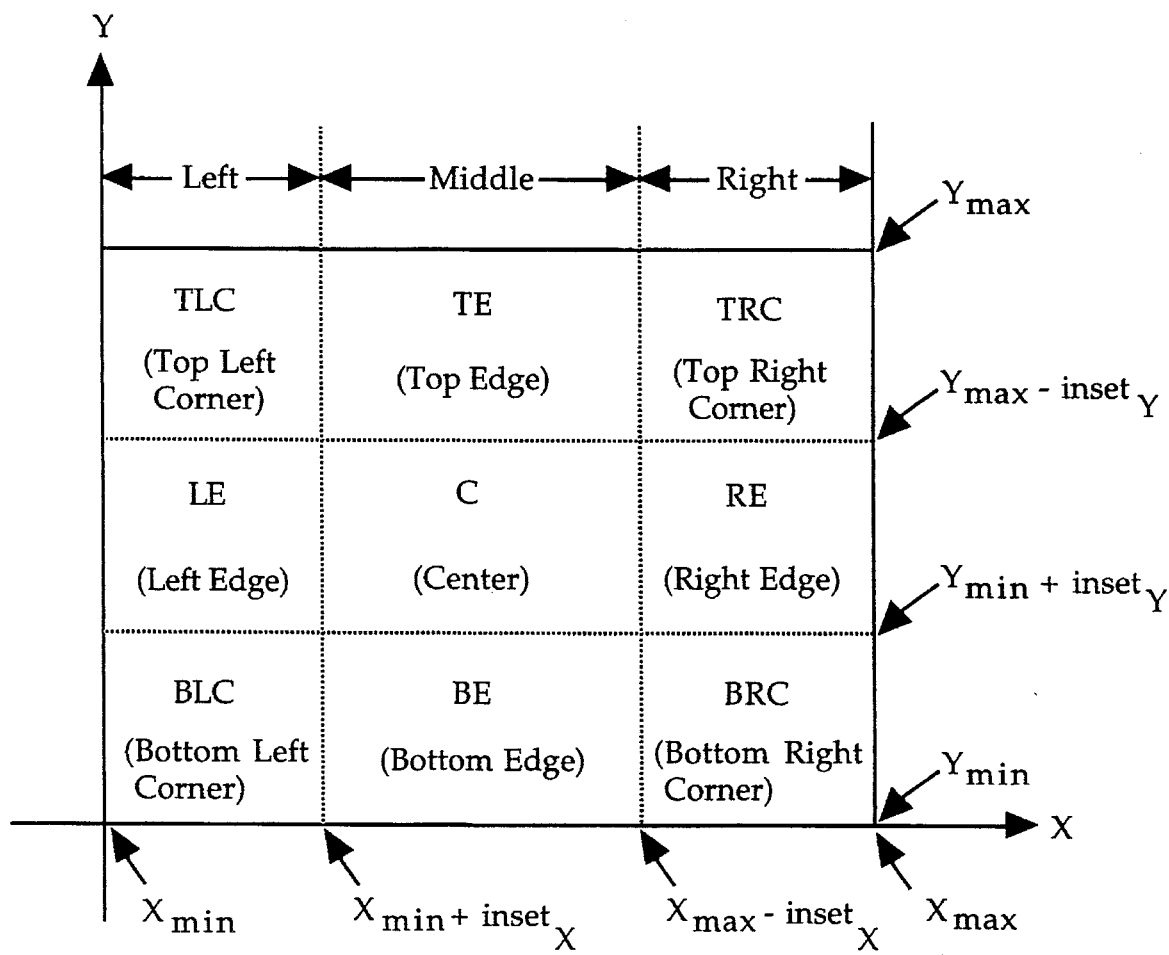
FIG. 14 depicts the active zone layout and determination of which active zone was selected by the user.

In the preferred embodiment of the present invention each face of the bounding box is subdivided into nine active zone rectangular subregions which thus makes it a simple matter to determine in which of the nine regions the hitpoint lies 511. In the preferred embodiment of the present invention, an index scheme is used to indicate which active zone was selected. Referring now to FIG. 14, because it is already known that a face of the bounding box was hit, in the preferred embodiment of the present invention determining which particular active zone is selected uses the following steps for each coordinate axis of the hit face:

---

ZONE = 0 (0000 in binary);
For the X axis:

is X > Xmin + $inset_x$?
    yes:  is X > Xmax − $inset_x$?
        yes:  hitpoint is in right portion of hit face
                ZONE = ZONE + 1 (01 in binary)
        no:   hitpoint is in middle portion of hit face
                ZONE = ZONE + 0 (00 in binary)
    no:   hitpoint is in left portion of hit face
           ZONE = ZONE + 2 (10 in binary)
For the Y axis:

is Y > Ymin + $inset_y$?
    yes:  is Y > Ymax − $inset_y$?
        yes:  hitpoint is in top portion of hit face
                ZONE = ZONE + 4 (0100 in binary)
        no:   hitpoint is in middle portion of hit face
                ZONE = ZONE + 0 (0000 in binary)
    no:   hitpoint is in bottom portion of hit face
           ZONE = ZONE + 8 (1000 in binary)
Please note that X and Y in the above determinations should everywhere be replaced by appropriate indices determined by the coordinates of the current hitface, as was stated above.

---

Figure 15:
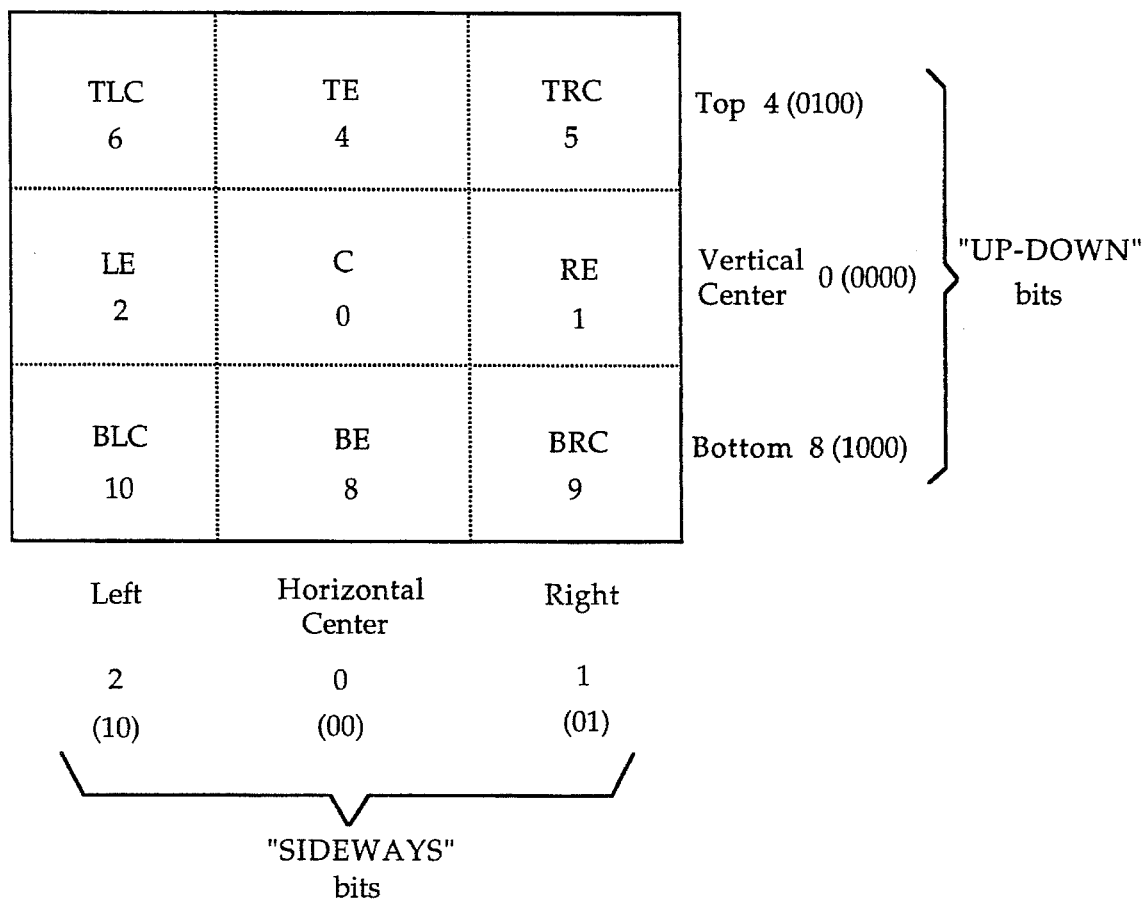
FIG. 15 depicts the indexing scheme of the active zone layout and determination of which active zone was selected by the user.

Referring now to FIG. 15, by either logically OR'ing or numerically adding the resulting values, an index value is generated which indicates which particular active zone was selected. For example, if the bottom left corner active zone (scaling, in the preferred embodiment of the present invention) is selected, then the X axis determination would yield a value of 2 (10 in binary) and the Y axis determination would yield a value of 8 (1000 in binary). In that case, the resulting index value of the selected active zone hitpoint would be 10 (1010 in binary). Similarly, if the right edge active zone (rotation in the preferred embodiment of the present invention) is selected, then the X axis determination would yield a value of 1 (01 in binary) and the Y axis determination would yield a value of 0 (0000 in binary). In that case, the resulting index value of the selected active zone hitpoint would be 1 (or 0001 in binary).

Figure 16:
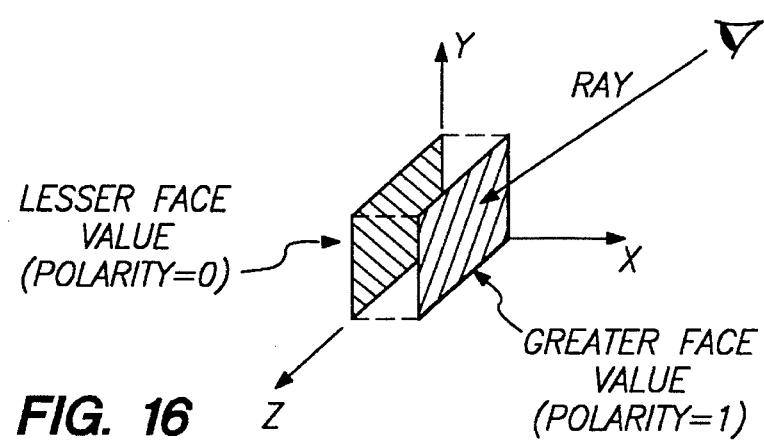
FIG. 16 depicts the polarity of the selected bounding box face of the present invention.

The classification (which manipulation type: scale, rotate or translate) of which of the nine active zones of the preferred embodiment of the present invention was hit is stored. Also stored, as is well known in the art, is the index of the axis that is perpendicular to the face that was hit. By assigning each axis to an index value (X=0, Y=1 and Z=2), it is a simple matter to determine the other two axes given any one of the three by merely adding 1 and 2 respectively to the index of the given axis and taking the result modulo 3. Finally, a flag specifying which of the two parallel faces of the box along this axis was hit (the "polarity") is stored. Referring now to FIG. 16, the polarity refers to the face, of the two parallel faces, of the bounding box having the greater face value along the axis perpendicular to the hit face. Please note that determination of the axis perpendicular to the hit face, determining the polarity of the hit face, and using indices for coordinate axes are techniques well known in the art. Together, these three variables completely determine the active zone that was hit (note that in total there are 9 active zones per box face and 6 box faces and therefore a total of 54 active zones in the preferred embodiment of the present invention).

If a translation zone was hit by the viewing ray then a translation manipulation will be caused by any further movement of the mouse while the user continues to hold the mouse button down. This is discussed below with reference to FIG. 6. However, if a rotation zone was hit by the viewing ray then a rotation manipulation will be caused by any further movement of the mouse while the user continues to hold the mouse button down. This is discussed below with reference to FIG. 7. Lastly, if a scaling zone was hit by the viewing ray then a scaling manipulation will be caused by any further movement of the mouse while the user continues to hold the mouse button down. This is discussed below with reference to FIG. 8.

Figure 6:
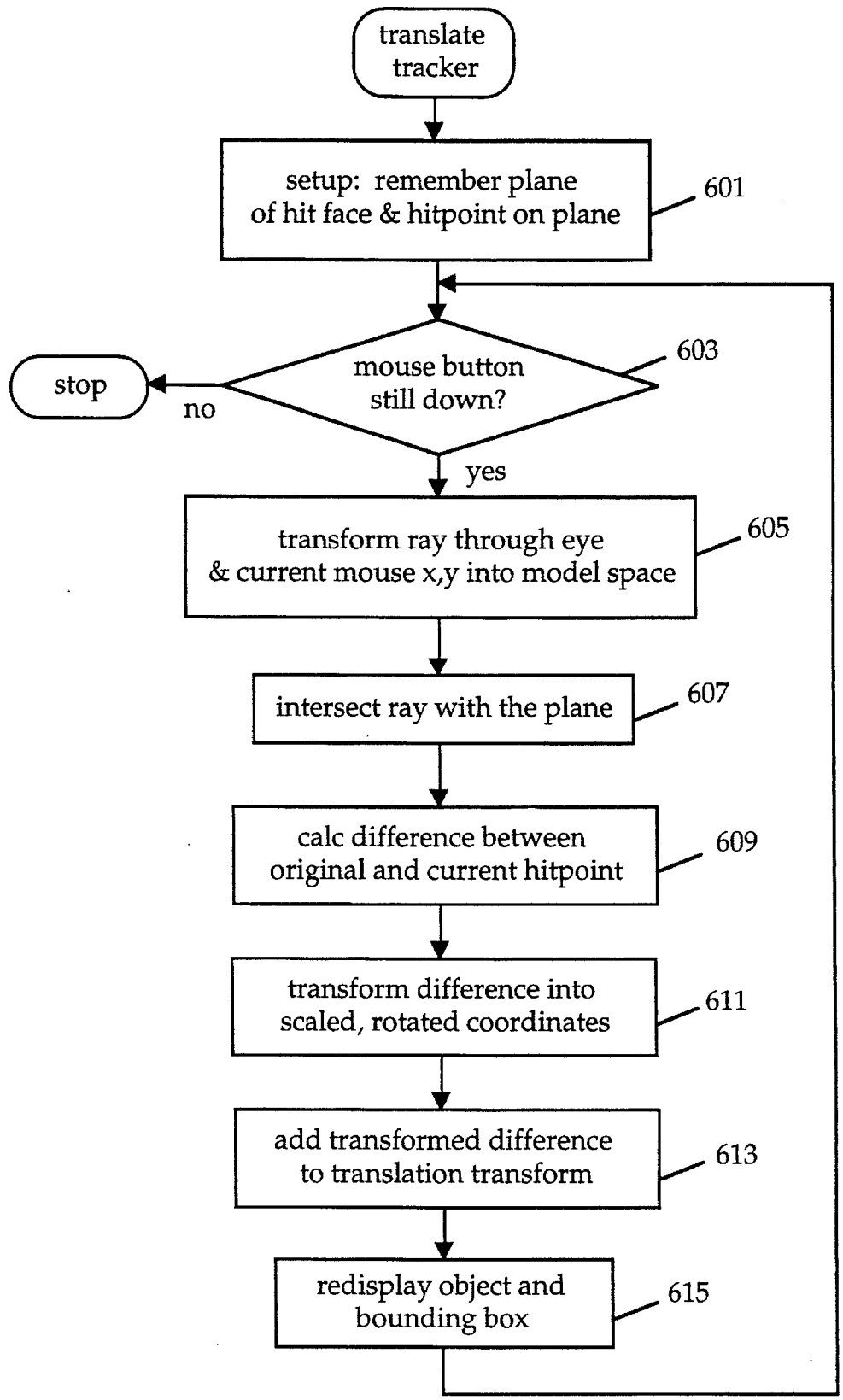
FIG. 6 is a flowchart depicting the translation manipulation sequence of steps.

Referring to FIG. 6, the translation sequence will now be described. Again, as was stated above, the calculated active zone classification, the perpendicular axis and the polarity are stored. The original three separate scaling, rotation and translation transforms (at the time the mouse button was first clicked on the active zone) are also remembered. Finally, the indices of the two axes of the face that was hit are also stored. This is because in a translation manipulation the bounding box, and the object it contains, will be moved along the hit plane of these two axes.

After first determining that the user is still pressing the mouse button down 603 (whereas if not then the translation manipulation is exited) then a ray through the current cursor x,y location is transformed into model space 605. In other words, as long as the user is still pressing the mouse button, it must next be determined what effect any movement of the mouse as indicated by a change in pointer location would have on the bounding box and the object it contains. This is accomplished by first creating a ray from the eyepoint through the current mouse pointer x,y location and translating that ray into the model space of the object. This ray translation, as was explained above with reference to the active zone selection, is achieved by an inverse transform which thus simplifies the following calculations because all box-planes are axis-parallel in model coordinate space.

Then it is determined where the translated ray intersects the plane of the selected face and active zone 607. The equations for the planes through the hit face are simple in model coordinates:

| axis perp. to hit face | plane equation (in normal, distance form) |
|---|---|
| x | $n = [1\ 0\ 0], d = -IP_x$ |
| y | $n = [0\ 1\ 0], d = -IP_y$ |
| z | $n = [0\ 0\ 1], d = -IP_z$ | where IP is the 3-D intersection point of the original ("mouse-down") viewing ray which selected the bounding box active zone in model space coordinates. To intersect a plane (n,d) with a viewing ray in model space coordinates (origin', direction'), one must first calculate the parametric t along the ray where the intersection occurs:

$$t = -(n \cdot \text{origin}' + d)/n \cdot \text{direction}'$$

where • denotes the dot product. Please note, however, that in the preferred embodiment of the present invention, full dot products are not necessary because the plane normals n are very simple because the zeroes cancel out and hence two-thirds of the calculations need not even be made. To get a 3-D intersection point, t must merely be back-substituted into the ray equation such that:

$$IP = \text{origin}' + t \cdot \text{direction}'$$

Now IP is the new intersection point in model space coordinates. Again, in the preferred embodiment of the present invention, only two of the three coordinates of the new IP need to be calculated because the third coordinate stays constant as the bounding box and the object it contains moves in the chosen plane.

This thus provides two intersection points in the plane the bounding box and the object it contains are to be translated in: the original hitpoint that was stored in step 601 and the current hitpoint just now determined in step 607. Next the difference between these two hitpoints is calculated 609. This difference, which represents the amount of movement or translation the user has indicated via movement of the mouse pointer, is then transferred into scaled, rotated coordinates 611. This is done in order to operate in translate space (as is explained more fully below with reference to FIG. 10).

The new translation is added to the original translation transformation and the translation transformation is set to this sum 613. In other words, the new translation is added to the original translation transformation in order to create a new combined translation transformation which includes the user's latest manipulations.

Figure 9:
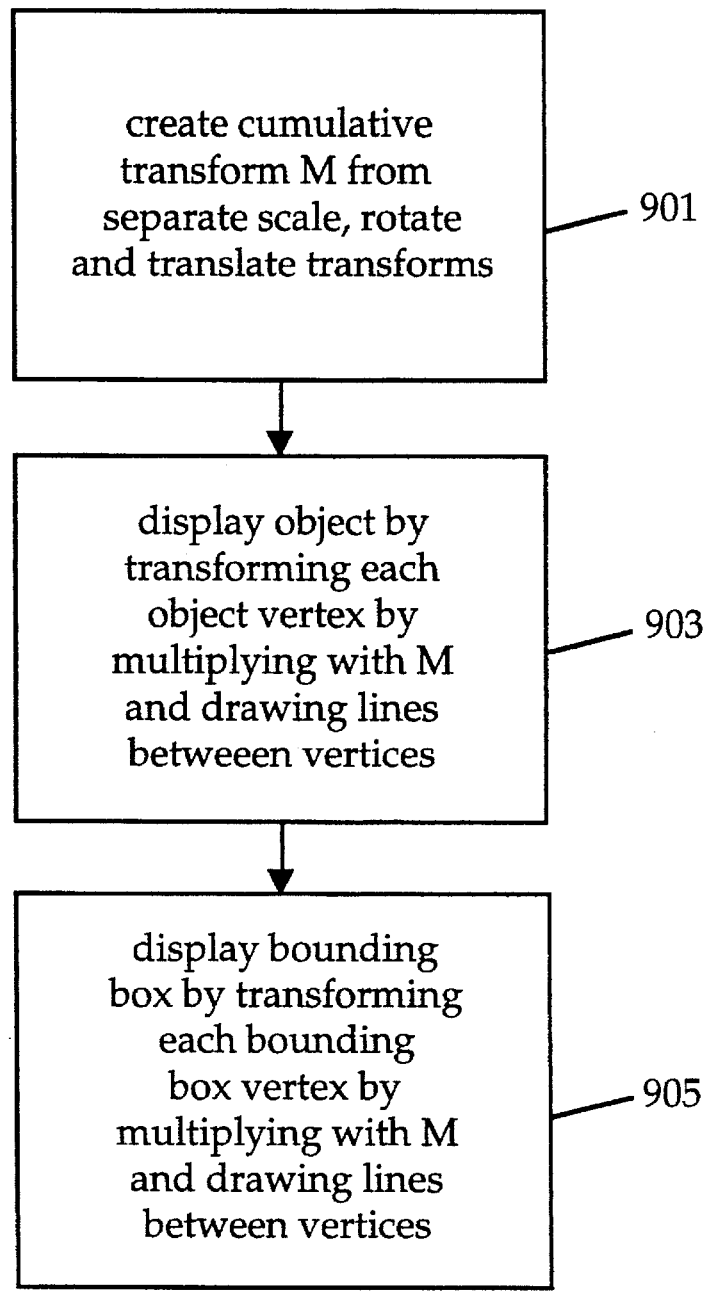
FIG. 9 is a flowchart depicting the sequence of steps to re-display a manipulated object and bounding box.

Now that the translation transform includes the latest user manipulation, the bounding box and the object it contains can be re-displayed 615. Referring now to FIG. 9, re-displaying the bounding box and the object within it is achieved by first creating a cumulative transform M from the current three separate scale, rotate and translate transforms 901. Then the object is re-displayed, in the preferred embodiment of the present invention, by transforming each vertex of the object from model space to world space by multiplying the vertices by M, passing the transformed object vertices through a viewing matrix V (which defines where the camera is located, where the camera is pointed, the focal length of the lens, and the camera screen geometry; please note that these techniques are well known in the art) and drawing lines between the transformed object vertices 903. Finally, to re-display the bounding box, in the preferred embodiment of the present invention, each vertex of the bounding box is transformed by multiplying the vertices by M and the viewing matrix V and drawing lines between the transformed bounding box vertices 905.

Referring again to FIG. 6, after re-displaying the object and bounding box 615, the mouse button is again checked 603 to determine whether the user has finished all current translation manipulations. If the user has finished all current translation manipulations, the user will no longer be pressing the mouse button. However, if the user has not yet finished all current manipulations then the user will still be pressing the mouse button and the same sequence of steps 605 through 615 will be followed. In this way, the bounding box and the object within it will appear to the user to continuously move, or translate, across the screen as the user moves the pointer with the mouse while continuing to hold the mouse button down. These continuous movements will only pause while the user stops moving the mouse and will only stop when the user stops pressing the mouse button down.

In an alternative embodiment, a gridding capability is provided whereby movements would be constrained along box coordinate system axes so as to stay on the intersections of a three-dimensional grid. In a further embodiment, the gridding is enabled after the intersection point is transformed into world space, resulting in gridding in world space which would thus not be affected by the orientation of the bounding box in model space. In a still further embodiment, a constrain mechanism is triggered by, for example, the user holding down a particular (e.g., shift) key (or making a menu selection or setting a preference option) when pressing the mouse button to select an active zone and manipulate the bounding box and object within. The shift-constrain mechanism would constrain the bounding box and object to movements which lie along the one axis which has the larger translation component at the time the shift key is pressed. A still further alternative embodiment would limit translation to a specified volume in 3-D space. For example, when moving a chair in a room on the visual display the chair would be limited by the room boundaries.

Figure 17:
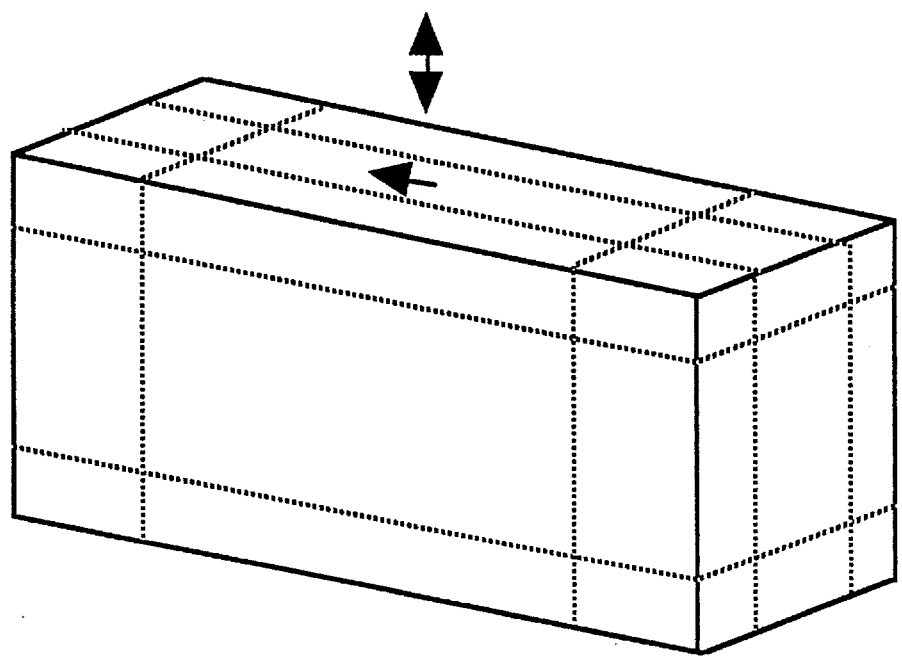
FIG. 17 depicts the translate-pull manipulation alternative embodiment of the present invention.

A further embodiment still, referring now to FIG. 17, provides a translate manipulation with one degree of freedom where this one degree of freedom is perpendicular to the two degrees of freedom enabled by the translate-slide manipulation. This one degree of freedom is perpendicular to the selected face of the bounding box and is known as a "translate-pull" manipulation. In the translate-pull manipulation, invoked by holding down the option key while clicking the button when the pointer is positioned over a translate active zone, the bounding box and the object within it are moved in a direction perpendicular to the chosen face in order to provide a direct lifting action. Please note that this embodiment could be an alternative default setting rather than being enabled by holding down the option key.

Figure 7:
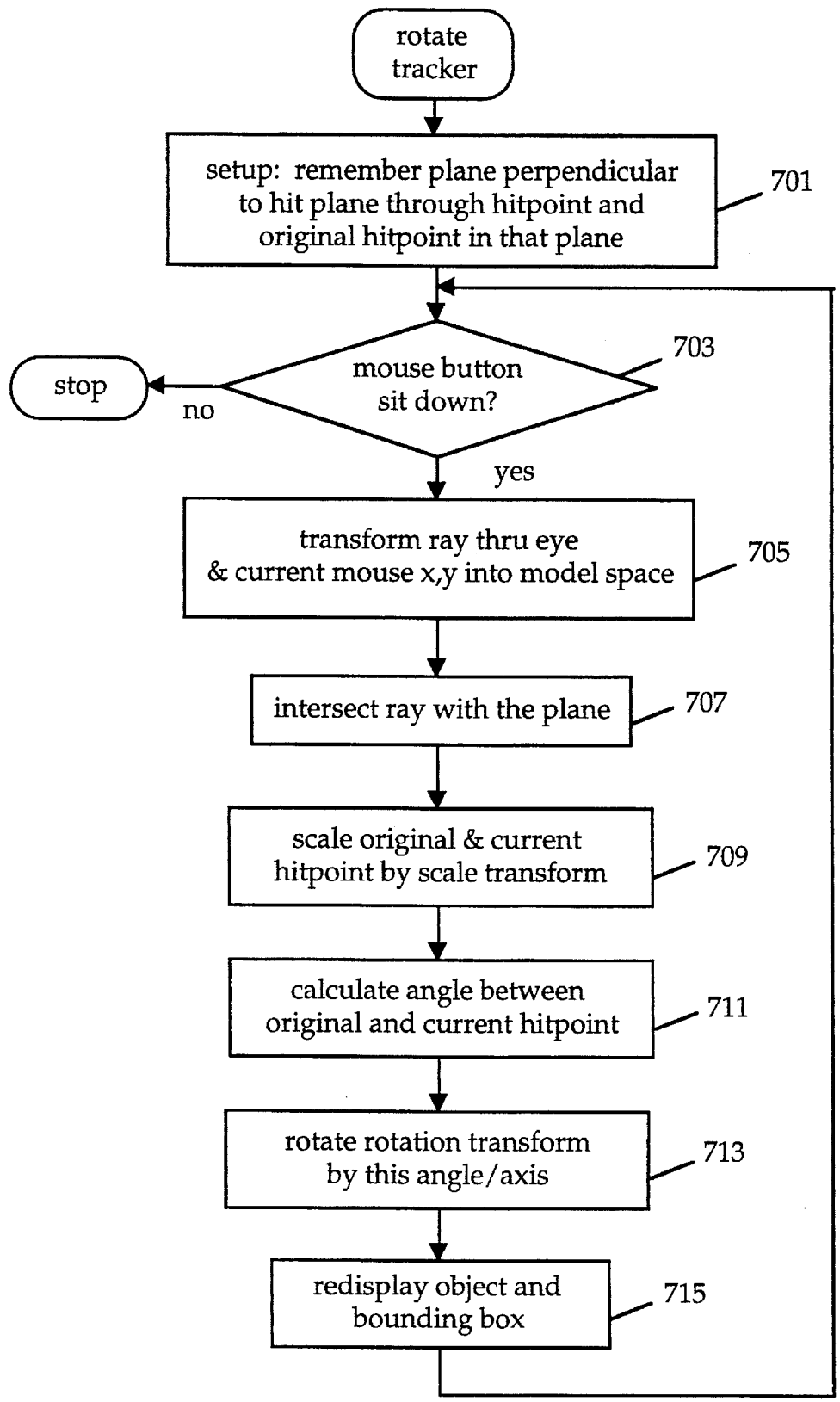
FIG. 7 is a flowchart depicting the rotation manipulation sequence of steps.

Referring to FIG. 7, the rotation sequence will now be described. Again, as was stated above, the calculated active zone classification, the axis and the polarity are stored. The original three separate scaling, rotation and translation transforms—at the time the mouse button was first clicked on the active zone—are also saved 701. Finally, the index of the axis around which rotation will occur is also stored. This is because in a rotation manipulation the bounding box and the object it contains will be rotated around this axis. Please note that in the preferred embodiment of the present invention the center line of the bounding box, which passes through the origin of the mode space coordinate system, is the axis of rotation. Alternative embodiments support moving the axis of rotation elsewhere within the box, for instance to an edge of the bounding box, and even to an axis outside of the bounding box. Furthermore, in an alternative embodiment of the present invention, an indicator such as a cross-hair or visible rotation axis line would be displayed when a rotation manipulation was selected to thus inform the user of the current axis of rotation.

After first determining that the user is still pressing the mouse button down 703 (whereas if the user has stopped pressing the mouse button down then the rotation manipulation is exited) then a ray through the current mouse x,y location is transformed into model space 705. Please note that this is accomplished in the same manner as step 605 in the translation manipulation sequence.

Then it is determined where the translated ray intersects the plane of the selected face and active zone 707. Please note that this is accomplished in the same manner as step 605 in the translation manipulation sequence. This thus provides two intersection points in the plane the bounding box and the object it contains are to be rotated in: the original hit point that was stored in step 701 and the current hit just now determined in step 707.

Figure 18:
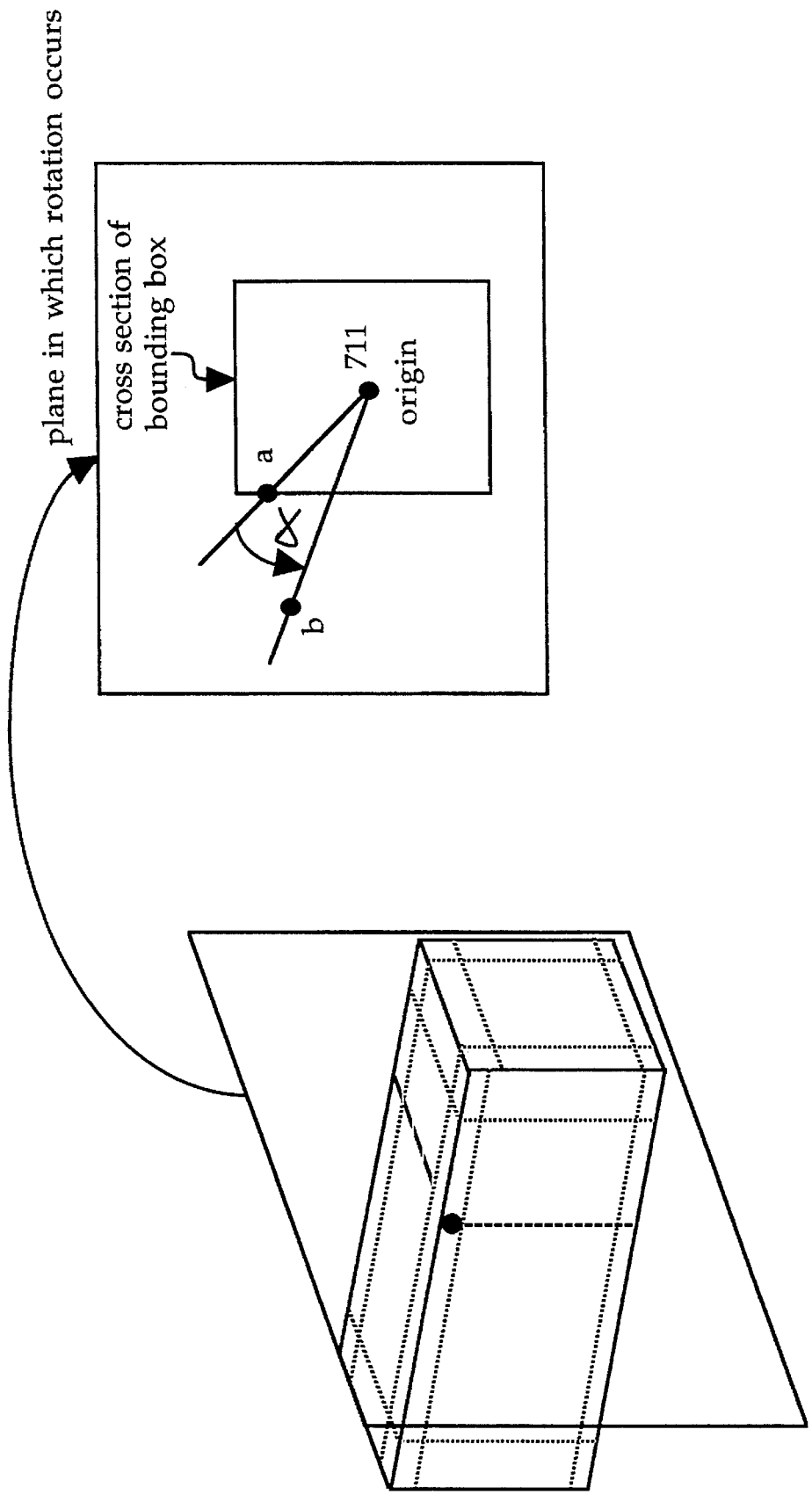
FIG. 18 depicts the rotation manipulation determination of the preferred embodiment of the present invention.

Next, both the original hitpoint A and the current hitpoint B are inverse-transformed through the scale transform 709. Please note that it is important to include the scaling transform (as was stated above) when calculating the intersection points A and B. This is because non-homogenous scaling transforms would change the angles, so in the preferred embodiment of the present invention angle α (explained below) is calculated in scaled space. Please note that because all operations can now be performed in model space with axis-aligned planes, calculating this angle is essentially two-dimensional and is thus computationally more efficient than using a full 3-D algorithm. Referring now to FIG. 18, two lines are formed from the origin 711 of the bounding box, one line through the original intersection point A of the original viewing ray with the bounding box and one line through the intersection point B of the current viewing ray with the rotation plane. The angle between them is then determined by the equation:

$$\alpha = \arctan(-A \times B / A \cdot B)$$
$$\text{if } (A \cdot B < 0), \text{ then}$$
$$\text{if } (A \times B < 0)$$
$$\alpha = \alpha + \pi$$
$$\text{else } \alpha = \alpha - \pi$$

where • is the dot product and x is the cross product.

Referring again to FIG. 7, this angle α is used to construct a rotation matrix which is then preconcatenated into the original rotation matrix (earlier stored, as was discussed above with reference to step 701) and the rotation transform of the bounding box is then set to this compound transform 713. Please note that this is explained more fully below with reference to FIG. 10.

Lastly, now that the rotation transform includes the latest user manipulation, the bounding box and the object it contains can be re-displayed 715. Please note that this is accomplished in the same manner as step 615 in the translation manipulation sequence (and thus follows the sequence of steps discussed above with reference to FIG. 9).

After re-displaying the object and bounding box 715, the mouse button is again checked 703 to determine whether the user has finished all current rotation manipulations. If the user has finished all current rotation manipulations, the user will no longer be pressing the mouse button. However, if the user has not yet finished all current rotation manipulations then the user will still be pressing the mouse button and the same sequence of steps 705 through 715 will be followed. In this way, the bounding box and the object within it will appear to the user to continuously move, or rotate, on the screen as the user moves the pointer with the mouse while continuing to hold the mouse button down. These continuous movements will only pause while the user stops moving the mouse and will only stop when the user stops pressing the mouse button down.

In an alternative embodiment, the rotation manipulations are constrained to increments of multiples of a predefined angle. For instance, increment angles would be constrained to multiples of 45 degrees when the shift key is held down during rotations. To constrain the angle, the rotation transform of the bounding box would be stored as three successive rotation angles, one of which would be added to $\alpha$ to constrain the result. In a still further embodiment of the present invention, if the rotation transform was stored as three successively applied rotation angles around the X, Y and Z axes respectively, then the rotation angles could be limited or gridded separately for each of the three axes. This would provide for simulating certain joint styles such as an elbow joint or a shoulder joint which have limited ranges of rotation or even no range of rotation along some axes and would also provide for a "ratchet wheel" simulation where rotation angles are quantized to specified multiples of an angle.

Figure 8:
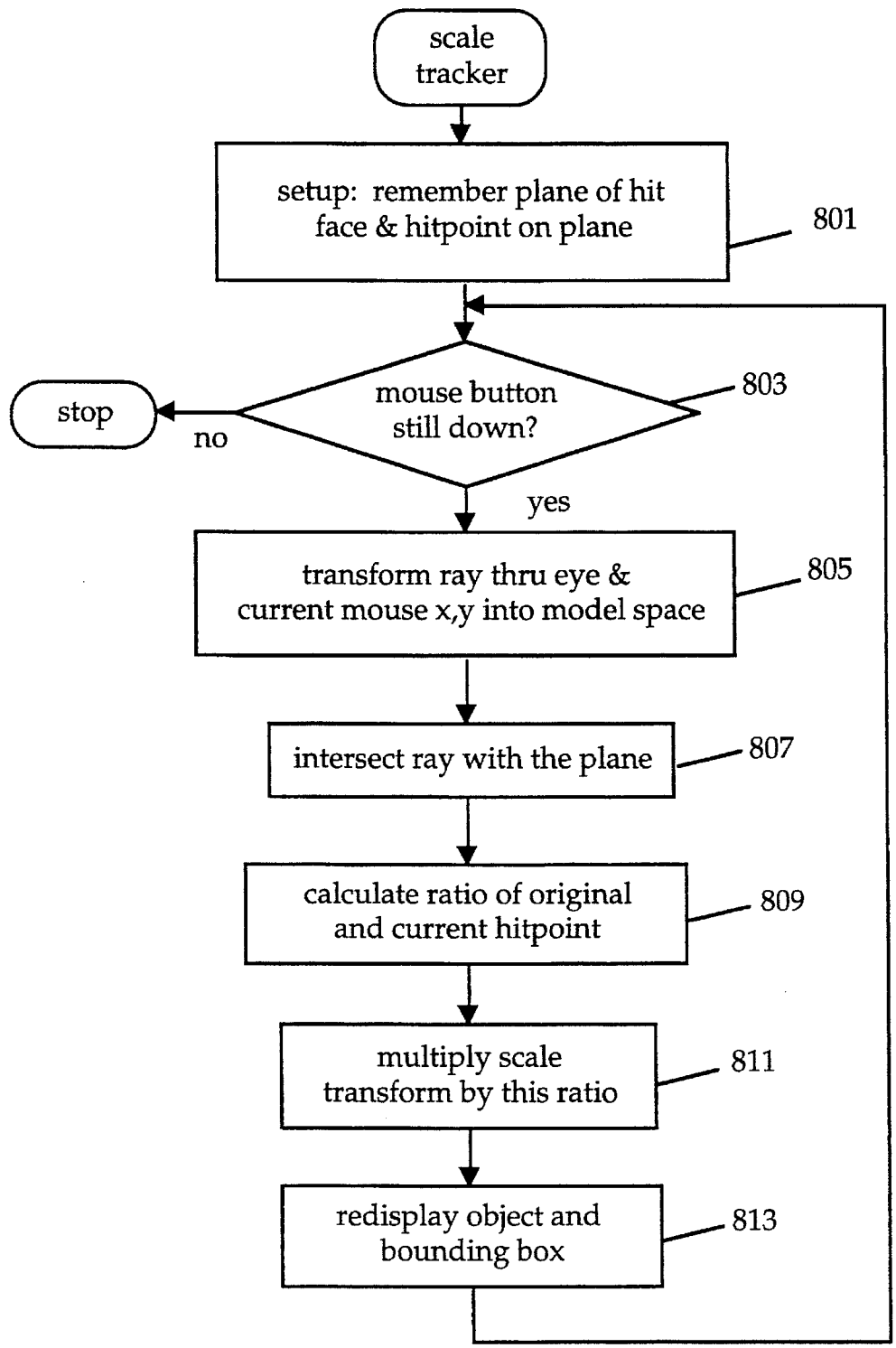
FIG. 8 is a flowchart depicting the scaling manipulation sequence of steps.

Referring to FIG. 8, the scaling sequence will now be described. Again, as was stated above, the calculated active zone classification, the axis and the polarity are stored. The original three separate scaling, rotation and translation transforms—at the time the mouse button was first clicked on the active zone—are also saved 801. Finally, the index of the plane in which scaling will occur is also stored. This is because in a scaling manipulation the bounding box, and the object it contains, will be scaled in a single plane in the preferred embodiment of the present invention.

After first determining that the user is still pressing the mouse button down 803 (whereas if the user has stopped pressing the mouse button down then the scaling manipulation is exited) then a ray through the current mouse x,y location is transformed into model space 805. Please note that this is accomplished in the same manner as step 605 in the translation manipulation sequence.

Figure 19:
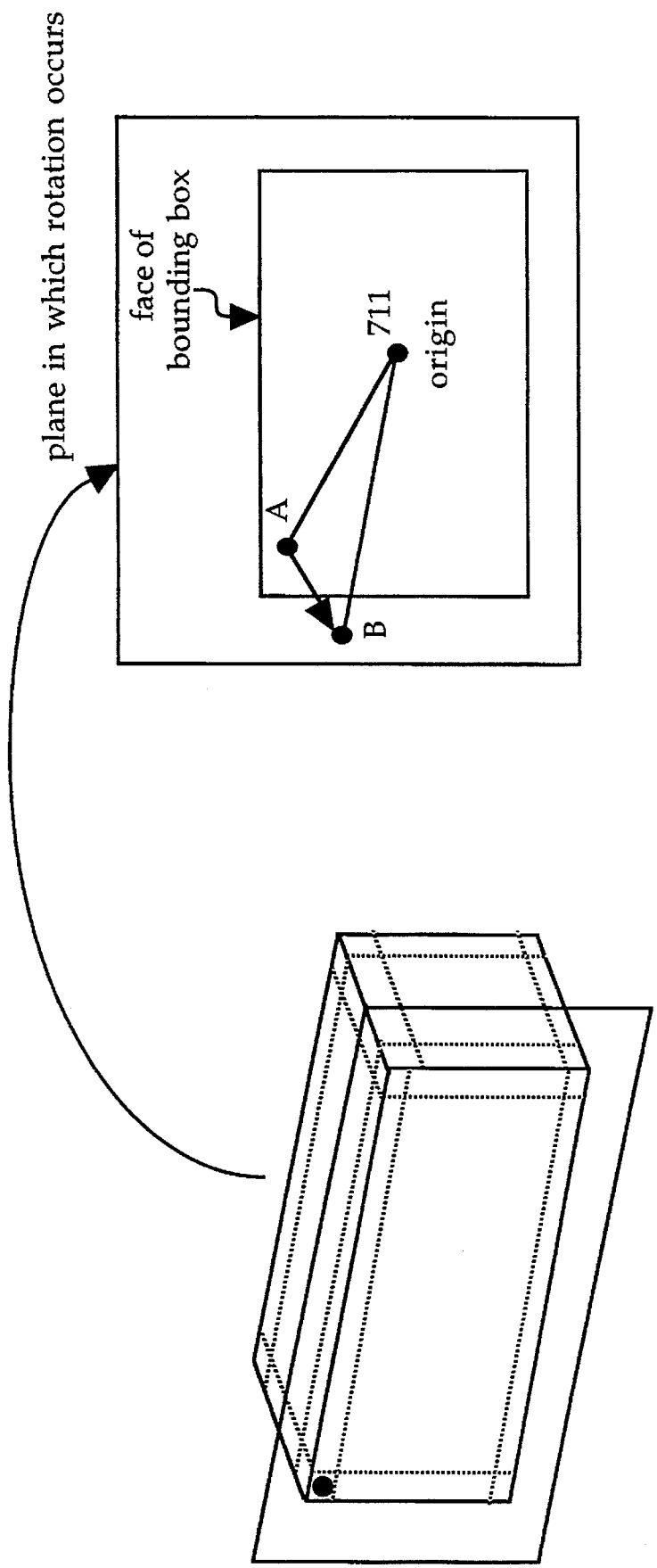
FIG. 19 depicts the scaling manipulation determination of the preferred embodiment of the present invention.

Then it is determined where the translated ray intersects the plane of the selected face and active zone 807. Please note that this is accomplished in the same manner as step 605 in the translation manipulation sequence. This thus provides two intersection points in the plane the bounding box will be scaled in: the original hit point A that was stored in step 801 and the current hitpoint B just now determined in step 807 as can be seen with reference to FIG. 19.

Next, the ratio of the original hitpoint A and the current hitpoint B is determined 807. Note that neither of these points needs to be inverse transformed before this calculation can be made because they are both already in the same space and because they are both only one transform away from model space. In other words, because both the original hitpoint A and the current hitpoint B are only the scaling transform away from model space, they are in the same relative space and scaling calculations can be made directly on them.

Referring again to FIG. 8, these 2-D points A and B are then used to update the scaling transform 811. The ratio of B/A is then multiplied into the current scaling transform to yield a new scaling transform. Please note that in the preferred embodiment of the present invention scaling along the one axis that is not involved remains unchanged by these computations.

Lastly, now that the scaling transform includes the latest user manipulation, the bounding box and the object it contains can be re-displayed 813. Please note that this is accomplished in the same manner as step 615 in the translation manipulation sequence (and thus follows the sequence of steps discussed above with reference to FIG. 9).

After re-displaying the object and bounding box 813, the mouse button is again checked 803 to determine whether the user has finished all current scaling manipulations. If the user has finished all current scaling manipulations, the user will no longer be pressing the mouse button. However, if the user has not yet finished all current scaling manipulations then the user will still be pressing the mouse button and the same sequence of steps 805 through 813 will be followed. In this way, the bounding box and the object within it will appear to the user to continuously scale on the screen as the user moves the pointer with the mouse while continuing to hold the mouse button down. These continuous movements will only pause while the user stops moving the mouse and will only stop when the user stops pressing the mouse button down.

In an alternative embodiment, and similarly to an alternative embodiment of the translation manipulation as discussed above, scaling is gridded or constrained. This would prevent objects from becoming smaller than a predefined (or user settable) minimum size and would prevent a negative scaling manipulation which would otherwise cause an object to flip around within itself.

Figure 10:
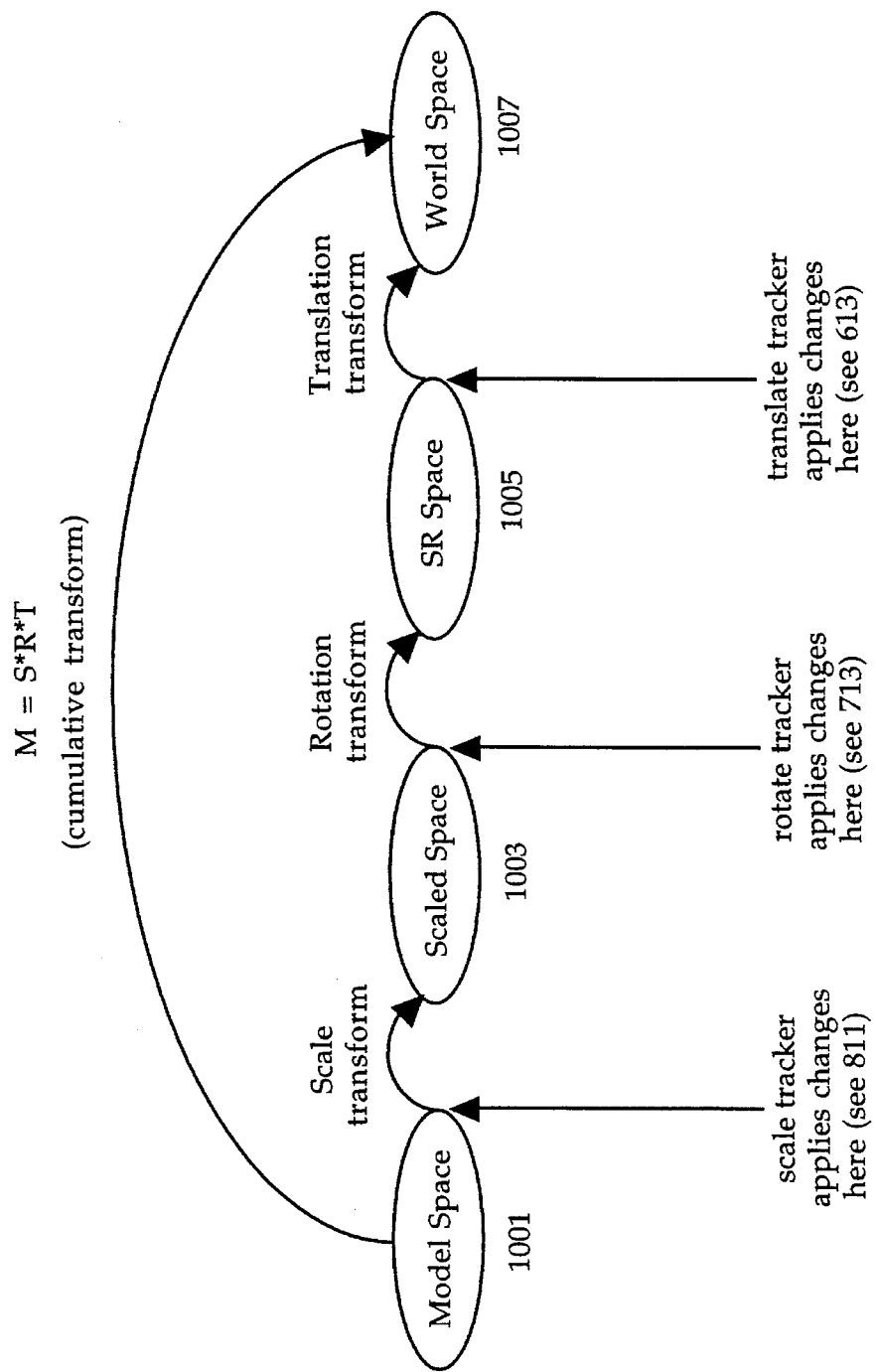
FIG. 10 depicts the transformation relationships of the present invention.

Referring now to FIG. 10, the relationships between each of the three separate transforms—scaling, rotation and translation—will now be explained. One way an object in model space 1001 can reach world space 1007 is to pass through a single combined transformation M. The other way an object in model space 1001 can reach world space 1007 is to first pass through a scaling transformation to reach scaled space 1003, then pass through a rotation transformation to reach scaled/rotated space 1005 and then pass through a translation transformation to reach scaled/rotated/translated space which is world space 1007. In the preferred embodiment of the present invention, these three separate transforms (scaling, rotation and translation) are separately stored so as to allow individual modification to each without affecting the others. In other words, the present invention stores each of the three transformations depicted in FIG. 10 separately rather than store a single transformation M.

It is important to note that this sequence of a scaling transformation, followed by a rotation transformation, followed by a translation transformation is necessary because the transformations do not, generally speaking, commute. In other words, if the order of the transformations were altered, subsequent manipulations could skew or distort the shape of the object. Therefore the order of the transformations is constrained to scaling, then rotation, then translation.

The fact that transformations do not generally commute is why the scaling sequence of steps applies changes to the scaling transform and thus deals with the object in model space 1001 and why the rotation sequence of steps applies changes to the rotation transform and thus deals with the object in scaled space 1003 and why the translation sequence of steps applies changes to the translation transform and thus deals with the object in scaled/rotated space 1005. Furthermore, this is why the sequence of moving into and out of different spaces is slightly different in each of the three manipulation transformations discussed above with reference to FIGS. 6–8.

A further consideration arises when, due to the camera position (the user's viewpoint) and the physical display size or area available for object display (e.g., the object could be in a window on the display which window is smaller than the total display area), the object to be manipulated is larger than the area available to the user. In this case, generating a bounding box which encloses the object would thus cause the bounding box to also be larger than the available viewing area and as such the user would not be able to view all of the normally visible faces of the bounding box and thus the user would potentially not have access to some or all of the normally available object manipulations.

To address this issue, an alternative embodiment would, upon noting an object size larger than the available viewing area, provide a reduced size bounding box thus still providing the user with complete access to all of the available object manipulations. The implementation of such an alternative embodiment would be readily apparent to one of ordinary skill in the art based upon the teachings of the present invention (e.g., a scaling factor could be applied to the object dimensions to fool the bounding box generation means into thinking that the object is smaller than it actually is).

Providing a bounding box which is not of equal size with the dimensions of the object to be manipulated provides further capabilities. For instance, if the user wished to manipulate multiple objects as a single group, a reduced size bounding box based on a space size which encompasses all of the objects desired to be included in the group could be used. Stated differently, objects (for instance furniture in a room or scene) could be individually selected thus providing a finite sized bounding box. This embodiment would thus provide object manipulation. Alternatively, a scene of objects (for instance a room containing furniture) could be selected thus again providing a finite sized bounding box, albeit reduced in size to provide user access to all of the available manipulations, but one which properly acts as if it encloses all of the objects which are included in that scene. This embodiment would thus provide manipulation of the camera geometry. Still further, a mathematically infinite space such as world space could be manipulated by providing at least one finite small bounding box that completely fits within the viewing area. All objects defined in the infinite space being manipulated would then be manipulated accordingly. This embodiment would thus provide manipulation of an arbitrary mathematical space including world space and camera space.

In the foregoing specification, the invention has been described with reference to a specific exemplary embodiment and alternative embodiments thereof. It will, however, be evident that various modifications and changes may be made thereto without departing from the broader spirit and scope of the invention as set forth in the appended claims. The specifications and drawings are, accordingly, to be regarded in an illustrative rather than a restrictive sense.

What is claimed is:

1. A method for manipulating an object displayed in three-dimensional representation on a computer controlled display system having a computer and a display coupled to the computer, comprising the steps of:

a) providing a user actuated input controller signal for selectively positioning a reference indicator on the display;

b) positioning the reference indicator over the displayed object and signaling the computer to activate a control movement mode;

c) providing on the display a three-dimensional representation of a bounding region including at least two portions which specify respective predefined control movement types, one of said types being rotation around an axis parallel to the portion which specifies rotation around that axis;

d) positioning the reference indicator over one of said portions;

e) signaling the computer to activate a predefined control movement type specified by the portion of the bounding region under the reference indicator, and while the reference indicator is over said portion, repositioning the reference indicator to define a movement of the specified type; and f) re-displaying the displayed object in accordance with the defined movement of the specified type.

2. The method of claim 1 wherein the three-dimensional representation of a bounding region is a generally rectilinear bounding box, and wherein the step of re-displaying further comprises re-displaying the bounding box in accordance with the defined movement of the predefined control movement type.

3. The method of claim 1 wherein the bounding region is reduced in size relative to the displayed object.

4. The method of claim 1 wherein the input controller signal is from a mouse.

5. The method of claim 4 wherein the reference indicator is a pointer displayed on the display.

6. The method of claim 5 wherein the step of signaling the computer to activate the control movement mode includes the step of activating a switch.

7. The method of claim 6 wherein the step of activating a switch comprises pressing a button on the mouse.

8. The method of claim 6 wherein the step of signaling the computer to activate a predefined control movement type includes the step of activating a switch.

9. The method of claim 8 wherein the step of activating a switch comprises pressing a button on the mouse.

10. The method of claim 1 further comprising, in step (e), after signaling the computer to activate a predefined control movement type, changing the shape of the reference indicator and thus indicating, to a user of the method, a type and direction of available object manipulations.

11. The method of claim 1 wherein the portion of the bounding region is an active zone.

12. The method of claim 1 wherein the portion of the bounding region defines a handle which graphically distinguishes said portion from the remainder of the bounding region.

13. The method of claim 12 wherein the handle indicates, to a user of the method, a type and direction of available object manipulations.

14. The method of claim 12 wherein the handle extends outwardly from the bounding region such that the outwardly extending handle presents an appearance of being available to be selected by the reference indicator.

15. The method of claim 12 wherein the handle is shaped like a rod.

16. The method of claim 12 wherein the handle is shaped like a cube.

17. The method of claim 12 wherein the handle is shaped like an arrow.

18. The method of claim 1 wherein the portion of the bounding region is an image of a hand.

19. The method of claim 18 wherein the hand indicates to a user of the method a type and direction of available object manipulations.

20. The method of claim 18 wherein the hand looks like a human hand.

21. The method of claim 20 wherein the hand appears to be grabbing the three-dimensional representation of a bounding region.

22. The method of claim 18 wherein the hand looks like a mechanical hand.

23. The method of claim 22 wherein the hand appears to be grabbing the three-dimensional representation of a bounding region.

24. The method of claim 1 wherein the predefined control movement type is a translation of the displayed object.

25. The method of claim 24 wherein the translation of the displayed object is along model space coordinate axes.

26. The method of claim 25 wherein the translation of the displayed object in model space is parallel to a plane of a face of the bounding region.

27. The method of claim 25 wherein the translation of the displayed object in model space is perpendicular to a plane of a face of the bounding region.

28. The method of claim 24 wherein the translation of the displayed object is performed by determining a difference in model space between a position of the reference indicator when the translation operation was activated and a current position of the reference indicator, and transforming the difference into scaled and rotated coordinates using a scale transform and a rotate transform, and adding the transformed difference to a translation transform to create a new translation transform, and wherein re-displaying the displayed object on the video display is in accordance with the scale transform, the rotate transform and the new translation transform.

29. The method of claim 24 wherein translation of the displayed object is parallel to a plane of a face of the bounding region and is limited to a predefined range of translation manipulations.

30. The method of claim 1 wherein the axis of rotation of the displayed object is parallel to model space coordinate axes.

31. The method of claim 30 wherein the rotation of the displayed object in model space is around an axis of the bounding region.

32. The method of claim 31 wherein the axis of rotation is a center line of the bounding region.

33. The method of claim 31 wherein the axis of rotation is an edge of the bounding region.

34. The method of claim 33 wherein the axis of rotation is around a bounding region edge opposite from the portion of the bounding region under the reference indicator.

35. The method of claim 30 wherein the axis of rotation is outside of the bounding region.

36. The method of claim 1 wherein the rotation of the displayed object is performed by transforming a position of the reference indicator when the rotation operation was activated by a scale transform, and transforming a current position of the reference indicator by the scale transform and determining an angle created thereby versus a center point of the displayed object, and concatenating a rotation matrix of the angle into a rotation transform to create a new rotation transform, and wherein re-displaying the displayed object on the video display is in accordance with the scale transform, the new rotation transform and a translation transform.

37. The method of claim 1 wherein a second of the predefined control movement types is a scaling of the displayed object.

38. The method of claim 37 wherein the scaling of the displayed object is along model space coordinate axes.

39. The method of claim 38 wherein the scaling in model space is parallel to a plane of a face of the bounding region.

40. The method of claim 38 wherein the scaling is homogenous.

41. The method of claim 37 wherein the scaling of the displayed object is performed by determining a ratio of a position of the reference indicator versus an origin of the bounding region when the scaling operation was activated and a current-position of the reference indicator versus the origin of the bounding region and multiplying the ratio with a scale transform to create a new scale transform and wherein re-displaying the displayed object on the video display is in accordance with the new scale transform, a rotate transform and a translation transform.

42. The method of claim 41 wherein scaling of the displayed object is parallel to a plane of a face of the bounding region and is limited to a predefined range of scaling manipulations.

43. A method for manipulating an object displayed in three-dimensional representation on a computer controlled video display system having a computer, a video display and a mouse, comprising the steps of:

a) selecting the displayed object by using the mouse to position a pointer over the displayed object and pressing a button on the mouse;

b) displaying a three-dimensional representation of a bounding box having at least two active zones which specify respective available movement types, one of said types being rotation around an axis parallel to the zone which specifies rotation around that axis, when the displayed object is selected;

c) defining a movement of a type predefined by one of the active zones by using the mouse to position the pointer over an active zone, pressing the button on the mouse, and, while the pointer is over the active zone, repositioning the pointer with the mouse; and d) re-displaying the bounding box and the displayed object in accordance with the defined movement.

44. The method of claim 43 wherein the available movement types further comprise translation and scaling.

45. The method of claim 44 wherein if the predefined movement type is translation then the translation of the displayed object and the bounding box is performed by determining a difference in model space between a position of the pointer when the pointer was positioned over the active zone and the mouse button was pressed and a current position of the pointer, and transforming the difference into scaled and rotated coordinates using a scale transform and a rotate transform and adding the transformed difference to a translation transform to create a new translation transform, and wherein re-displaying the bounding box and the displayed object is in accordance with the scale transform, the rotate transform and the new translation transform.

46. The method of claim 44 wherein if the predefined movement type is rotation then the rotation of the displayed object and the bounding box is performed by transforming a position of the pointer when the pointer was positioned over the active zone and the mouse button was pressed by a scale transform and transforming a current position of the pointer by the scale transform and determining an angle created thereby versus a center point of the displayed object and concatenating a rotation matrix of the angle into a rotation transform to create a new rotation transform, and wherein re-displaying the displayed object and the bounding box on the video display is in accordance with the scale transform, the new rotation transform and a translation transform.

47. The method of claim 44 wherein if the predefined movement type is scaling then the scaling of the displayed object and the bounding box is performed by determining a ratio of a position of the pointer versus an origin of the bounding box when the pointer was positioned over the active zone and the mouse button was pressed and a current position of the pointer versus the origin of the bounding box and multiplying the ratio with a scaling transform to create a new scaling transform and wherein re-displaying the displayed object and the bounding box on the video display is in accordance with the new scaling transform, a rotate transform and a translation transform.

48. An apparatus for manipulating an object displayed in three-dimensional representation on a computer controlled display system having a computer and a display coupled to the computer, the apparatus comprising:
   a) means for positioning a reference indicator over the displayed object and signaling the computer to activate a control movement mode;
   b) means for generating on the display a three-dimensional representation of a bounding region including at least two portions which specify respective predefined control movement types, one of said types being rotation around an axis parallel to the portion which specifies rotation around that axis;
   c) means for signaling the computer to activate a predefined control movement type specified by a portion of the bounding region under the reference indicator;
   d) means for repositioning the reference indicator while the reference indicator is over the portion of the bounding region to define a movement of the predefined control movement type; and
   e) means for re-displaying the displayed object in accordance with the defined movement of the predefined control movement type.

49. The apparatus of claim 48 wherein the three-dimensional representation of a bounding region is a generally rectilinear bounding box, and further comprising means for re-displaying the bounding box in accordance with the defined movement of the predefined control movement type.

50. The apparatus of claim 48 wherein the bounding region is reduced in size relative to the displayed object.

51. The apparatus of claim 48 wherein the positioning means and the repositioning means is a mouse.

52. The apparatus of claim 51 wherein the reference indicator is a pointer displayed on the display.

53. The apparatus of claim 52 wherein the means for signaling the computer to activate the control movement mode is a switch.

54. The apparatus of claim 53 wherein the switch is a button on the mouse.

55. The apparatus of claim 53 wherein the means for signaling the computer to activate a predefined control movement type includes a switch.

56. The apparatus of claim 55 wherein the switch is a button on the mouse.

57. The apparatus of claim 48 wherein the means for signaling the computer further comprises means for changing the shape of the reference indicator when the computer has been signaled to activate a predefined control movement type thus indicating to a user of the apparatus a type and direction of available object manipulations.

58. The apparatus of claim 48 wherein the portion of the bounding region is an active zone.

59. The apparatus of claim 48 wherein the portion of the bounding region defines a handle which graphically distinguishes said portion from the remainder of the bounding region.

60. The apparatus of claim 59 wherein the handle indicates, to a user of the apparatus, a type and direction of available object manipulations.

61. The apparatus of claim 59 wherein the handle extends outwardly from the bounding region such that the outwardly extending handle presents an appearance of being available to be selected by the reference indicator.

62. The apparatus of claim 59 wherein the handle is shaped like a rod.

63. The apparatus of claim 59 wherein the handle is shaped like a cube.

64. The apparatus of claim 59 wherein the handle is shaped like a arrow.

65. The apparatus of claim 48 wherein the portion of the bounding region is an image of a hand.

66. The apparatus of claim 65 wherein the hand indicates to a user of the apparatus a type and direction of available object manipulations.

67. The apparatus of claim 65 wherein the hand looks like a human hand.

68. The apparatus of claim 67 wherein the hand appears to be grabbing the three-dimensional representation of a bounding region.

69. The apparatus of claim 65 wherein the hand looks like a mechanical hand.

70. The apparatus of claim 69 wherein the hand appears to be grabbing the three-dimensional representation of a bounding region.

71. The apparatus of claim 48 wherein the predefined control movement type is a translation of the displayed object.

72. The apparatus of claim 71 wherein the translation of the displayed object is along model space coordinate axes.

73. The apparatus of claim 72 wherein the translation of the displayed object in model space is parallel to a plane of a face of the bounding region.

74. The apparatus of claim 72 wherein the translation of the displayed object in model space is perpendicular to a plane of a face of the bounding region.

75. The apparatus of claim 71 wherein the translation of the displayed object is performed by determining a difference in model space between a position of the reference indicator when the translation operation was activated and a current position of the reference indicator and transforming the difference into scaled and rotated coordinates using a scale transform and a rotate transform and adding the transformed difference to a translation transform to create a new translation transform and wherein re-displaying the displayed object on the video display is in accordance with the scale transform, the rotate transform and the new translation transform.

76. The apparatus of claim 71 wherein translation of the displayed object is parallel to a plane of a face of the bounding region and is limited to a predefined range of translation manipulations.

77. The apparatus of claim 48 wherein the axis of rotation of the displayed object is parallel to model space coordinate axes.

78. The apparatus of claim 77 wherein the rotation in model space of the displayed object is around an axis of the bounding region.

79. The apparatus of claim 78 wherein the axis of rotation is a center line of the bounding region.

80. The apparatus of claim 78 wherein the axis of rotation is an edge of the bounding region.

81. The apparatus of claim 80 wherein the axis of rotation is around a bounding region edge opposite from the portion of the bounding region under the reference indicator.

82. The apparatus of claim 77 wherein the axis of rotation is outside of the bounding region.

83. The apparatus of claim 48 wherein the rotation of the displayed object is performed by transforming a position of the reference indicator when the rotation operation was activated by a scale transform and transforming a current position of the reference indicator by the scale transform and determining an angle created thereby versus a center point of the displayed object, and concatenating a rotation matrix of the angle into a rotation transform to create a new rotation transform, and wherein re-displaying the displayed object on the video display is in accordance with the scale transform, the new rotation transform and a translation transform.

84. The apparatus of claim 48 wherein a second of the predefined control movement types is a scaling of the displayed object.

85. The apparatus of claim 84 wherein the scaling of the displayed object is along model space coordinate axes.

86. The apparatus of claim 85 wherein the scaling in model space is parallel to a plane of a face of the bounding region.

87. The apparatus of claim 84 wherein the scaling is homogenous.

88. The apparatus of claim 84 wherein the scaling of the displayed object is performed by determining a ratio of a position of the reference indicator versus an origin of the bounding region when the scaling operation was activated and a current position of the reference indicator versus the origin of the bounding region and multiplying the ratio with a scale transform to create a new scale transform and wherein re-displaying the displayed object on the video display is in accordance with the new scale transform, a rotate transform and a translation transform.

89. The apparatus of claim 88 wherein scaling of the displayed object is parallel to a plane of a face of the bounding region and is limited to a predefined range of scaling manipulations.

90. An apparatus for manipulating an object displayed in three-dimensional representation on a computer controlled video display system having a computer, a video display and a mouse, the apparatus comprising:

a) means for selecting the displayed object by using the mouse to position a pointer over the displayed object and pressing a button on the mouse;

b) means for displaying a three-dimensional representation of a bounding box having at least two active zones which specify respective available movement types, one of said types being rotation around an axis parallel to the zone which specifies rotation around that axis, when the displayed object is selected;

c) means for defining a movement of a type predefined by one of the active zones by using the mouse to position the pointer over an active zone, pressing the button on the mouse, and, while the pointer is over the active zone, repositioning the pointer with the mouse; and d) means for re-displaying the bounding box and the displayed object in accordance with the defined movement.

91. The apparatus of claim 90 wherein the available movement types comprise translation and scaling.

92. The apparatus of claim 91 wherein if the predefined movement type is translation then the translation of the displayed object and the bounding box is performed by a means for determining a difference in model space between a position of the pointer when the pointer was positioned over the active zone and the mouse button was pressed and a current position of the pointer, and transforming the difference into scaled and rotated coordinates using a scale transform and a rotate transform and adding the transformed difference to a translation transform to create a new translation transform, and wherein re-displaying the bounding box and the displayed object is in accordance with the scale transform, the rotate transform and the new translation transform.

93. The apparatus of claim 91 wherein if the predefined movement type is rotation then the rotation of the displayed object and the bounding box is performed by a means for transforming a position of the pointer when the pointer was positioned over the active zone and the mouse button was pressed by a scale transform and transforming a current position of the pointer by the scale transform and determining an angle created thereby versus a center point of the displayed object and concatenating a rotation matrix of the angle into a rotation transform to create a new rotation transform and wherein re-displaying the displayed object and the bounding box on the video display is in accordance with the scale transform, the new rotation transform and a translation transform.

94. The apparatus of claim 91 wherein if the predefined movement type is scaling then the scaling of the displayed object and the bounding box is performed by a means for determining a ratio of a position of the pointer versus an origin of the bounding box when the pointer was positioned over the active zone and the mouse button was pressed and a current position of the pointer versus the origin of the bounding box and multiplying the ratio with a scaling transform to create a new scaling transform, and wherein re-displaying the displayed object and the bounding box on the video display is in accordance with the new scaling transform, a rotate transform and a translation transform.

* * * * *